(12) United States Patent  (10) Patent No.: US 9,398,059 B2
Shepherd et al.  (45) Date of Patent: Jul. 19, 2016

(54) MANAGING INFORMATION AND CONTENT SHARING IN A VIRTUAL COLLABORATION SESSION

(71) Applicant: Dell Products, L.P., Round Rock, TX (US)

(72) Inventors: Jason A. Shepherd, Austin, TX (US); Michael S. Gatson, Austin, TX (US); Todd Swierk, Austin, TX (US); Clifton J. Barker, Austin, TX (US); Yuan-Chang Lo, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 274 days.

(21) Appl. No.: 14/088,080

(22) Filed: Nov. 22, 2013

(65) Prior Publication Data

US 2015/0149929 A1   May 28, 2015

(51) Int. Cl.
*G06F 3/048* (2013.01)
*H04L 29/06* (2006.01)

(52) U.S. Cl.
CPC .................................. *H04L 65/403* (2013.01)

(58) Field of Classification Search
USPC .................................. 715/753, 757; 709/205
See application file for complete search history.

(56) References Cited

U.S. PATENT DOCUMENTS

| 5,581,702 | A | * | 12/1996 | McArdle | G06Q 10/10 370/261 |
| 2002/0169832 | A1 | * | 11/2002 | Lee | G06Q 10/10 709/205 |
| 2007/0033539 | A1 | * | 2/2007 | Thielman | G06F 1/16 715/769 |
| 2007/0150551 | A1 | * | 6/2007 | Krishnan | G06Q 10/10 709/218 |
| 2011/0270933 | A1 | * | 11/2011 | Jones | H04L 12/1822 709/206 |

* cited by examiner

*Primary Examiner* — Matthew Ell
(74) *Attorney, Agent, or Firm* — Fogarty, L.L.C.

(57) ABSTRACT

Systems and methods for managing information and content sharing in a virtual collaboration session. In some embodiments, a method may include creating a virtual collaboration workspace for a plurality of participants, where each of the participants operates a device configured to access the workspace, the workspace including a public portion and a plurality of private portions, the public portion accessible to each of the participants and each of the plurality of private portions accessible to a corresponding participant to the exclusion of at least another participant. The method may also include providing, to a given one of the participants, a representation of the public portion and a representation of the given participant's corresponding private portion, where the representation of the public portion and the representation of the given participant's corresponding private portion are renderable concurrently in a single window of a graphical user interface displayable by the given participant's device.

13 Claims, 16 Drawing Sheets

MANAGING INFORMATION AND CONTENT SHARING IN A VIRTUAL COLLABORATION SESSION

FIELD

This disclosure relates generally to computer systems, and more specifically, to systems and methods for managing information and content sharing in a virtual collaboration session.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some situations, two or more IHSs may be operated by different users or team members participating in a "virtual collaboration session" or "virtual meeting." Generally speaking, "virtual collaboration" is a manner of collaboration between users that is carried out via technology-mediated communication. Although virtual collaboration may follow similar processes as conventional collaboration, the parties involved in a virtual collaboration session communicate with each other, at least in part, through technological channels.

In the case of an IHS- or computer-mediated collaboration, a virtual collaboration session may include, for example, audio conferencing, video conferencing, a chat room, a discussion board, text messaging, instant messaging, shared database(s), whiteboarding, wikis, application specific groupware, or the like. For instance, "whiteboarding" is the placement of shared images, documents, or other files on a shared on-screen notebook or whiteboard. Videoconferencing and data conferencing functionality may let users annotate these shared documents, as if on a physical whiteboard. With such an application, several people may be able to work together remotely on the same materials during a virtual collaboration session.

SUMMARY

Embodiments of systems and methods for managing information and content sharing in a virtual collaboration session are described herein. In an illustrative, non-limiting embodiment, a method may include creating a virtual collaboration workspace for a plurality of participants, where each of the plurality of participants operates a respective device configured to access the virtual collaboration workspace, the virtual collaboration workspace including a public portion and a plurality of private portions, the public portion accessible to each of the plurality of participants and each of the plurality of private portions accessible to a corresponding one of the plurality of participants to the exclusion of at least another one of the plurality of participants. The method may also include providing, to a given one of the plurality of participants, a representation of the public portion and a representation of the given participant's corresponding private portion, where the representation of the public portion and the representation of the given participant's corresponding private portion are renderable concurrently in a single window of a graphical user interface displayable by the given participant's respective device.

In some implementations, the IHS may include a projector, and the method may include hosting a virtual collaboration session among the plurality of participants using the virtual collaboration workspace. For example, the projector may be configured to create a rendering of the public portion, the rendering viewable in person by at least a subset of the plurality of participants independently of whether the public portion is being displayed by the subset of participants' respective devices. Also, the virtual collaboration workspace may include a virtual whiteboard, and the method may include storing one or more aspects of the virtual collaboration workspace for reproduction after termination of the virtual collaboration session.

The method may also include maintaining an access control list for a piece of content stored in a folder associated with the virtual collaboration workspace. As such, the method may include receiving an indication that the given participant has added a piece of content to the public portion of the virtual collaboration workspace, and creating or modifying an entry on the access control list corresponding to the piece of content, the entry indicating that the piece of content is accessible to any of the plurality of participants.

In some cases, the piece of content may be created by the given participant in a whiteboard section of the given participant's corresponding private portion using the given participant's respective device, and prior to adding the piece of content, an entry on the access control list may correspond to the piece of content indicates that the piece of content is accessible to a private group associated with the given participant, the private group excluding one or more of the plurality of participants. Also, the given participant may add the piece of content by visually dragging a graphical representation of the piece of content from the given participant's corresponding private portion onto the public portion.

In other cases, the method may include receiving an indication that the given participant has added a piece of content to the given participant's corresponding private portion of the virtual collaboration workspace, and creating an entry on the access control list corresponding to the piece of content, the entry indicating that the piece of content is accessible to a private group associated with the given participant, the private group excluding one or more of the plurality of participants.

The method may further include providing a list of participants having access to the virtual collaboration workspace to each of the plurality of participants, such that the list of participants is renderable concurrently with the representation of the public portion and with the representation of the given participant's corresponding private portion in the single window of the graphical user interface displayable by the given participant's respective device.

The method may then include receiving an indication that the given participant has dragged and dropped a selected participant of the list of participants from the public portion to the given participant's corresponding private portion, and creating or modifying an entry on the access control list corresponding to a piece of content associated with the given participant's corresponding private portion, the entry indicating that the piece of content is accessible to the selected participant. Additionally or alternatively, the method may include receiving an indication that the given participant has dragged and dropped a selected participant of the list of participants from the given participant's corresponding private portion to the public portion, and creating or modifying an entry on the access control list corresponding to a piece of content associated with the given participant's corresponding private portion, the entry indicating that the piece of content is not accessible to the selected participant.

In another illustrative, non-limiting embodiment, another method may include establishing communications with a virtual collaboration host device, the virtual collaboration host device configured to host a virtual collaboration workspace having a public portion and a plurality of private portions, where the public portion is accessible to the plurality of participants and each of the plurality of private portions is accessible to a corresponding one of the plurality of participants to the exclusion of at least another one of the plurality of participants. The method may also include rendering, in a single window of a graphical user interface, a representation of the public portion and a representation of the given participant's corresponding private portion.

The method may further include identifying a dragging gesture configured to move a file to a file folder in the graphical user interface and uploading the file to a repository associated with the virtual collaboration workspace, wherein the uploaded file inherits an authorization privileges defined by the file folder. Additionally or alternatively, the method may include identifying a dragging gesture configured to move a file to the public portion of the virtual collaboration workspace and uploading the file to a repository associated with the virtual collaboration workspace, wherein the uploaded file is readable by any of the plurality of participants.

In some implementations, the method may include receiving a list of participants having access to the virtual collaboration workspace and rendering the list of participants concurrently with the representation of the public portion and the representation of the given participant's corresponding private portion in the single window of the graphical user interface. The method may also include identifying a dragging gesture configured to move content to a selected participant from the list of participants and transmitting an instruction that the selected participant be given moderator control over the content during the virtual collaboration session.

The method may include identifying a dragging gesture configured to move a selected participant from the list of participants to content displayed in the single window of the graphical user interface and transmitting an instruction that the selected participant be given editor control over the content during the virtual collaboration session. Additionally or alternatively, the method may include identifying a dragging gesture moving a selected participant from a section of the list of participants in the public portion to another section of the list of participants in the given participant's corresponding private portion and transmitting an instruction that the selected participant be given editor control over content associated with the given participant's corresponding private portion during the virtual collaboration session.

In yet another illustrative, non-limiting embodiment, yet another method may include receiving an indication that a given one of a plurality of participants of a virtual collaboration workspace has begun drawing on a shared whiteboard, the drawing having an initial point, and creating a virtual border around the initial point, where the virtual border defines a protected area associated with the given participant, and where the virtual border prevents at least another one of the plurality of participants from drawing within the protected area.

In some cases, the method may include removing the virtual border a predetermined amount of time after the given participant stops drawing in the protected area. The method may also include determining that the protected area overlaps with another protected area associated with another one of the plurality of participants, and shifting the protected area to a different location on the shared whiteboard in response to the determination and/or reducing a size of the protected area.

In some embodiments, one or more of the techniques described herein may be performed, at least in part, by an Information Handling System (IHS) operated by a given one of a plurality of participants of a virtual collaboration session. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
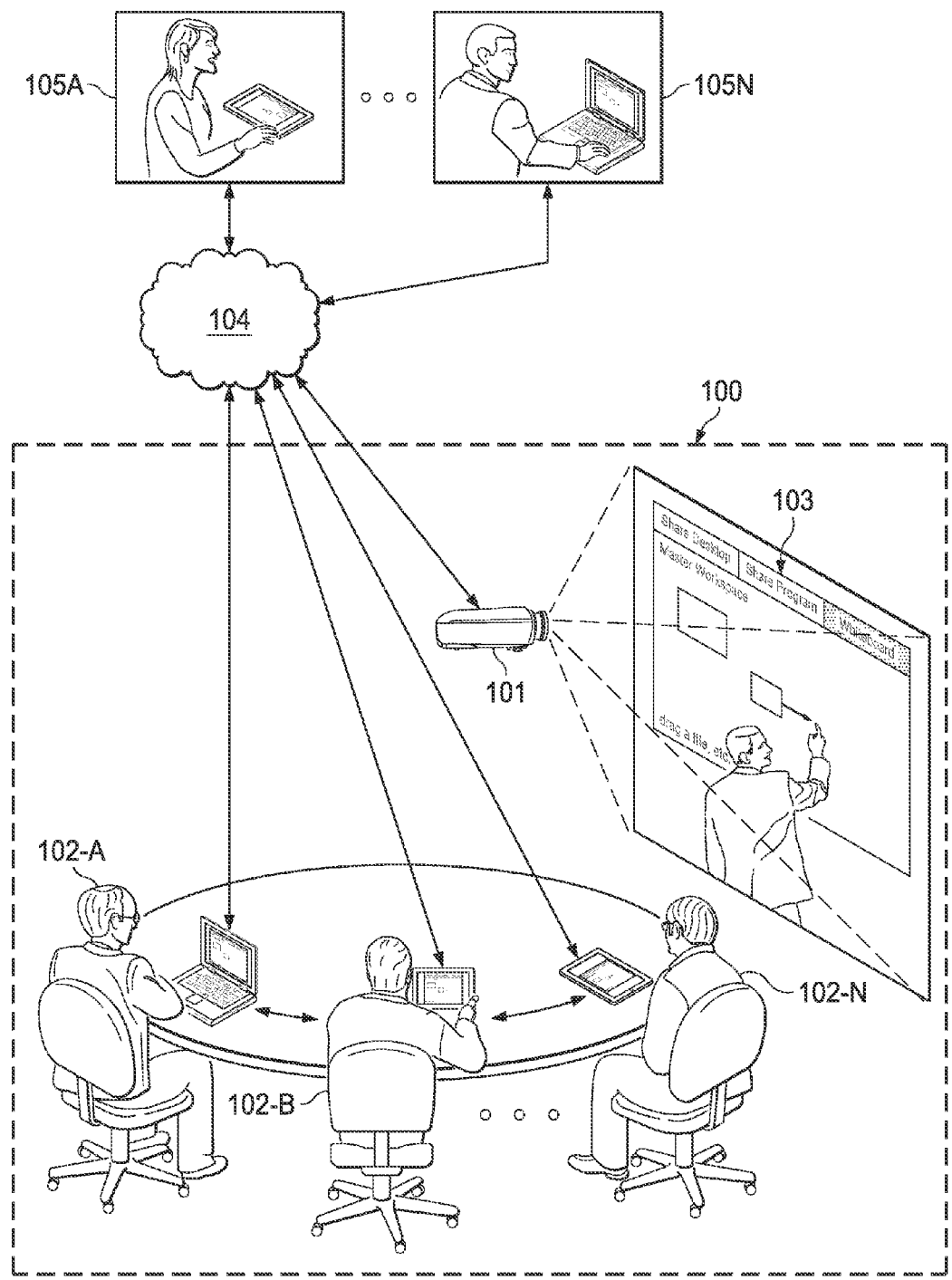
FIG. 1 is a diagram illustrating an example of an environment where systems and methods for managing information and content sharing in a virtual collaboration session may be implemented according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

Overview

The inventors hereof have recognized a need for new tools that enable better team interactions and improve effectiveness in the workplace, particularly as the workforce becomes more geographically-distributed and as the volume of business information created and exchanged increases to unprecedented levels. Existing tools intended to facilitate collaboration include digital whiteboarding, instant messaging, file sharing, and unified communication platforms. Unfortunately, such conventional tools are fragmented and do not adequately address certain problems specific to real-time interactions. In addition, these tools do not capitalize on contextual information for further gains in productivity and ease of use.

Examples of problems faced by distributed teams include the lack of a universally acceptable manner of performing whiteboarding sessions. The use of traditional dry erase boards in meeting rooms excludes or limits the ability of remote workers to contribute and current digital whiteboarding options are unnatural to use and are therefore not being adopted. In addition, there are numerous inefficiencies in setting up meeting resources, sharing in real-time, and distribution of materials after meetings such as emailing notes, presentation materials, and digital pictures of whiteboard sketches. Fragmentation across tool sets and limited format optimization for laptops, tablets, and the use of in-room projectors present a further set of issues. Moreover, the lack of continuity between meetings and desk work and across a meeting series including common file repositories, persistent notes and whiteboard sketches, and historical context can create a number of other problems and inefficiencies.

To address these, and other concerns, the inventors hereof have developed systems and methods that address, among other things, the setting up of resources for a virtual collaboration session, the taking of minutes and capture of whiteboard sketches, the creation and management to agendas, and/or provide the ability to have the right participants and information on hand for a collaboration session.

In some embodiments, these systems and methods focus on leveraging technology to increase effectiveness of real-time team interactions in the form of a "connected productivity framework." A digital or virtual workspace part of such a framework may include an application that enables both in-room and remote users the ability to interact easily with the collaboration tool in real-time. The format of such a virtual workspace may be optimized for personal computers (PCs), tablets, mobile devices, and/or in-room projection. The workspace may be shared across all users' personal devices, and it may provide a centralized location for presenting files and whiteboarding in real-time and from anywhere. The integration of context with unified communication and note-taking functionality provides improved audio, speaker identification, and automation of meeting minutes.

The term "context," as used herein, refers to information that may be used to characterize the situation of an entity. An entity is a person, place, or object that is considered relevant to the interaction between a user and an application, including the user and application themselves. Examples of context include, but are not limited to, location, people and devices nearby, and calendar events.

For instance, a connected productivity framework may provide, among other things, automation of meeting setup, proximity awareness for automatic joining of sessions, Natural User Interface (NUI) control of a workspace to increase the usability and adoption, intelligent information management and advanced indexing and search, and/or meeting continuity. Moreover, a set of client capabilities working in concert across potentially disparate devices may include: access to a common shared workspace with public and private workspaces for file sharing and real-time collaboration, advanced digital whiteboarding with natural input to dynamically control access, robust search functionality to review past work, and/or the ability to seamlessly moderate content flow, authorization, and intelligent information retrieval.

When certain aspects of the connected productivity framework described herein are applied to a projector, for instance, the projector may become a fixed point of reference providing contextual awareness. The projector may maintain a relationship to the room and associated resources (e.g., peripheral hardware). This allows the projector be a central hub for organizing meetings, and it does not necessarily rely on a host user and their device to be present for meeting and collaborating.

In some implementations, a cloud-hosted or enterprise service infrastructure as described herein may allow virtual collaboration session to be persistent. Specifically, once a document, drawing, or other content is used during a whiteboard session, for example, the content may be tagged as belonging to that session. When a subsequent session takes places that is associated with a previous session (and/or when the previous session is resumed at a later time), the content and transactions previously performed in the virtual collaboration environment may be retrieved so that, to participants, there is meeting continuity. In some embodiments, the systems and methods described herein may provide "digital video recorder" (DVR)-type functionality for collaboration sessions, such that participants may be able to record meeting events and play those events back at a later time, or "pause" the in-session content in temporary memory. The latter feature may enable a team to pause a meeting when they exceed the scheduled time and resume the in-session content in another available conference room, for example.

As will be understood by a person of ordinary skill in the art in light of this disclosure, virtually any commercial business setting that requires meeting or collaboration may implement one or more aspects of the systems and methods described herein. Additionally, aspects of the connected productivity framework described herein may be expanded to other areas, such as educational verticals for use in classrooms, or to consumers for general meet-ups.

Virtual Collaboration Architecture

Turning now to FIG. 1, a diagram illustrating an example of an environment where systems and methods for managing information and content sharing in a virtual collaboration session may be implemented is depicted according to some embodiments. As shown, interactive collaboration tool 101 operates as a central meeting host and/or shared digital whiteboard for conference room 100 in order to enable a virtual collaboration session. In some embodiments, interactive collaboration tool may include (or otherwise be coupled to) a real-time communications server, a web server, an object store server, and/or a database. Moreover, interactive collaboration tool 101 may be configured with built-in intelligence and contextual awareness to simplify meeting setup and provide continuity between meetings and desk work.

In some implementations, for example, interactive collaboration tool 101 may include a video projector or any other suitable digital and/or image projector that receives a video signal (e.g., from a computer, a network device, or the like) and projects corresponding image(s) 103 on a projection screen using a lens system or the like. In this example, image 103 corresponds to a whiteboarding application, but it should be noted that any collaboration application may be hosted and/or rendered using tool 101 during a virtual collaboration session.

Any number of in-room participants 102A-N and any number of remote participants 105A-N may each operate a respective IHS or computing device including, for example, desktops, laptops, tablets, or smartphones. In a typical situation, in-room participants 102A-N are in close physical proximity to interactive collaboration tool 101, whereas remote participants 105A-N are located in geographically distributed or remote locations, such as other offices or their homes. In other situations, however, a given collaboration session may include only in-room participants 102A-N or only remote participants 105A-N.

With regard to participants 102A-N and 105A-N, it should be noted that users participating in a virtual collaboration session or the like may have different classifications. For example, a participant may include a member of the session. A moderator may be an owner of the meeting workspace and leader that moderates the participants of the meeting. Often the moderator has full control of the session, including material content, what is displayed on the master workspace, and the invited list of participants. Moreover, an editor may include a meeting participant or the moderator who has write privileges to update content in the meeting workspace.

Interactive collaboration tool 101 and participants 102A-N and 105A-N may include any end-point device capable of audio or video capture, and that has access to network 104. In various embodiments, telecommunications network 104 may include one or more wireless networks, circuit-switched networks, packet-switched networks, or any combination thereof to enable communications between two or more of IHSs. For example, network 104 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

Figure 2:
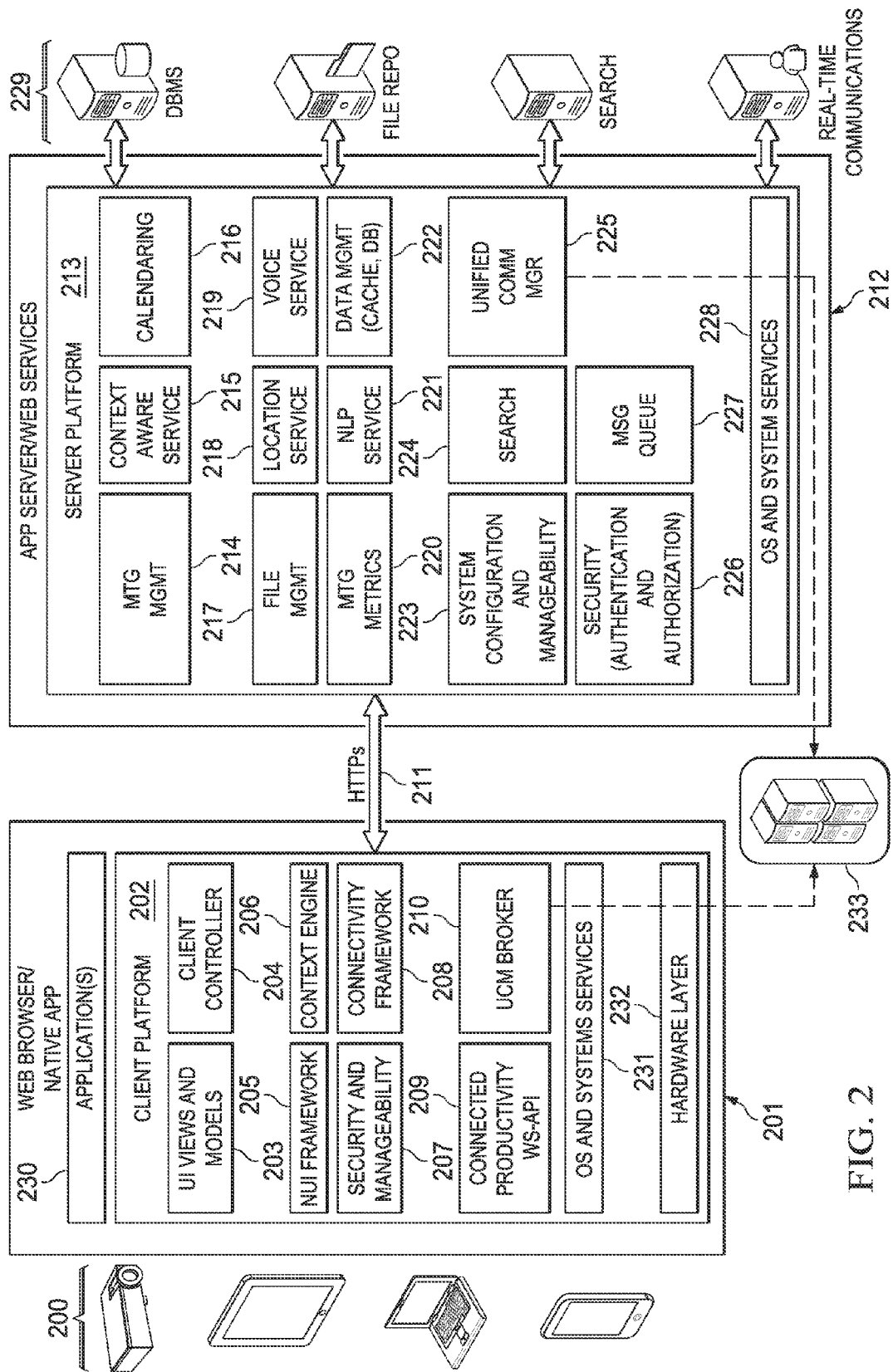
FIG. 2 is a block diagram of a cloud-hosted or enterprise service infrastructure for managing information and content sharing in a virtual collaboration session according to some embodiments.

FIG. 2 is a block diagram of a cloud-hosted or enterprise service infrastructure. In some embodiments, the infrastructure of FIG. 2 may be implemented in the context of environment of FIG. 1 for managing information and content sharing in a virtual collaboration session. Particularly, one or more participant devices 200 (operated by in-room participants 102A-N and/or remote participants 105A-N) may be each configured to execute client platform 202 in the form of a web browser or native application 201. As such, on the client side, one or more virtual collaboration application(s) 230 (e.g., a whiteboarding application or the like) may utilize one or more of modules 203-210, 231, and/or 232 to perform one or more virtual collaboration operations. Application server or web services 212 may contain server platform 213, and may be executed, for example, by interactive collaboration tool 101.

As illustrated, web browser or native application 201 may be configured to communicate with application server or web services 212 (and vice versa) via link 211 using any suitable protocol such as, for example, Hypertext Transfer Protocol (HTTP) or HTTP Secure (HTTPS). Each module within client platform 202 and application server or web services 212 may be responsible to perform a specific operation or set of operations within the collaborative framework.

Particularly, client platform 202 may include user interface (UI) view & models module 203 configured to provide a lightweight, flexible user interface that is portable across platforms and device types (e.g., web browsers in personal computers, tablets, and phones using HyperText Markup Language (HTML) 5, Cascading Style Sheets (CSS) 3, and/or JavaScript). Client controller module 204 may be configured to route incoming and outgoing messages accordingly based on network requests or responses. Natural User Interface (NUI) framework module 205 may be configured to operate various hardware sensors for touch, multi-point touch, visual and audio provide the ability for voice commands and gesturing (e.g., touch and 3D based). Context engine module 206 may be configured to accept numerous inputs such as hardware sensor feeds and text derived from speech. In some instances, context engine module 206 may be configured to perform operations such as, for example, automatic participant identification, automated meeting joining and collaboration via most effective manner, location aware operations (e.g., geofencing, proximity detection, or the like) and associated management file detection/delivery, etc.

Client platform 202 also includes security and manageability module 207 configured to perform authentication and authorization operations, and connectivity framework module 208 configured to detect and connect with other devices (e.g., peer-to-peer). Connected productivity module 209 may be configured to provide a web service API (WS-API) that allows clients and host to communicate and/or invoke various actions or data querying commands. Unified Communication (UCM) module 210 may be configured to broker audio and video communication including file transfers across devices and/or through third-party systems 233.

Within client platform 202, hardware layer 232 may include a plurality of gesture tracking (e.g., touchscreen or camera), audio and video capture (e.g., camera, microphone, etc.), and wireless communication devices or controllers (e.g., Bluetooth®, WiFi, Near Field Communications, or the like). Operating system and system services layer 231 may have access to hardware layer 232, upon which modules 203-210 rest. In some cases, third-party plug-ins (not shown) may be communicatively coupled to virtual collaboration application 230 and/or modules 203-210 via an Application Programming Interface (API).

Server platform 213 includes meeting management module 214 configured to handle operations such as, for example, creating and managing meetings, linking virtual workspace, notifying participants of invitations, and/or providing configuration for auto calling (push/pull) participants upon start of a meeting, among others. Context aware service 215 may be configured to provide services used by context engine 206 of client platform 202. Calendaring module 216 may be configured to unify participant and resource scheduling and to provide smart scheduling for automated search for available meeting times.

Moreover, server platform 213 also includes file management module 217 configured to provide file storage, transfer, search and versioning. Location service module 218 may be configured to perform location tracking, both coarse and fine grained, that relies on WiFi geo-location, Global Positioning System (GPS), and/or other location technologies. Voice service module 219 may be configured to perform automated speech recognition, speech-to-text, text-to-speech conversation and audio archival. Meeting metrics module 220 may be configured to track various meeting metrics such as talk time, topic duration and to provide analytics for management and/or participants.

Still referring to server platform 213, Natural Language Processing (NLP) service module 221 may be configured to perform automatic meeting summation (minutes), conference resolution, natural language understanding, named entity recognition, parsing, and disambiguation of language. Data management module 222 may be configured to provide distributed cache and data storage of application state and session in one or more databases. System configuration & manageability module 223 may provide the ability to configure one or more other modules within server platform 213. Search module 224 may be configured to enable data search operations, and UCM manager module 225 may be configured to enable operations performed by UCM broker 210 in conjunction with third-party systems 233.

Security (authentication & authorization) module 226 may be configured to perform one or more security or authentication operations, and message queue module 227 may be configured to temporarily store one or more incoming and/or outgoing messages. Within server platform 213, operating system and system services layer 228 may allow one or more modules 214-227 to be executed.

In some embodiments, server platform 213 may be configured to interact with a number of other servers 229 including, but not limited to, database management systems (DBMSs), file repositories, search engines, and real-time communication systems. Moreover, UCM broker 210 and UCM manager 225 may be configured to integrate and enhance third-party systems and services (e.g., Outlook®, Gmail®, Dropbox®, Box.net®, Google Cloud®, Amazon Web Services®, Salesforce®, Lync®, WebEx®, Live Meeting®) using a suitable protocol such as HTTP or Session Initiation Protocol (SIP).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
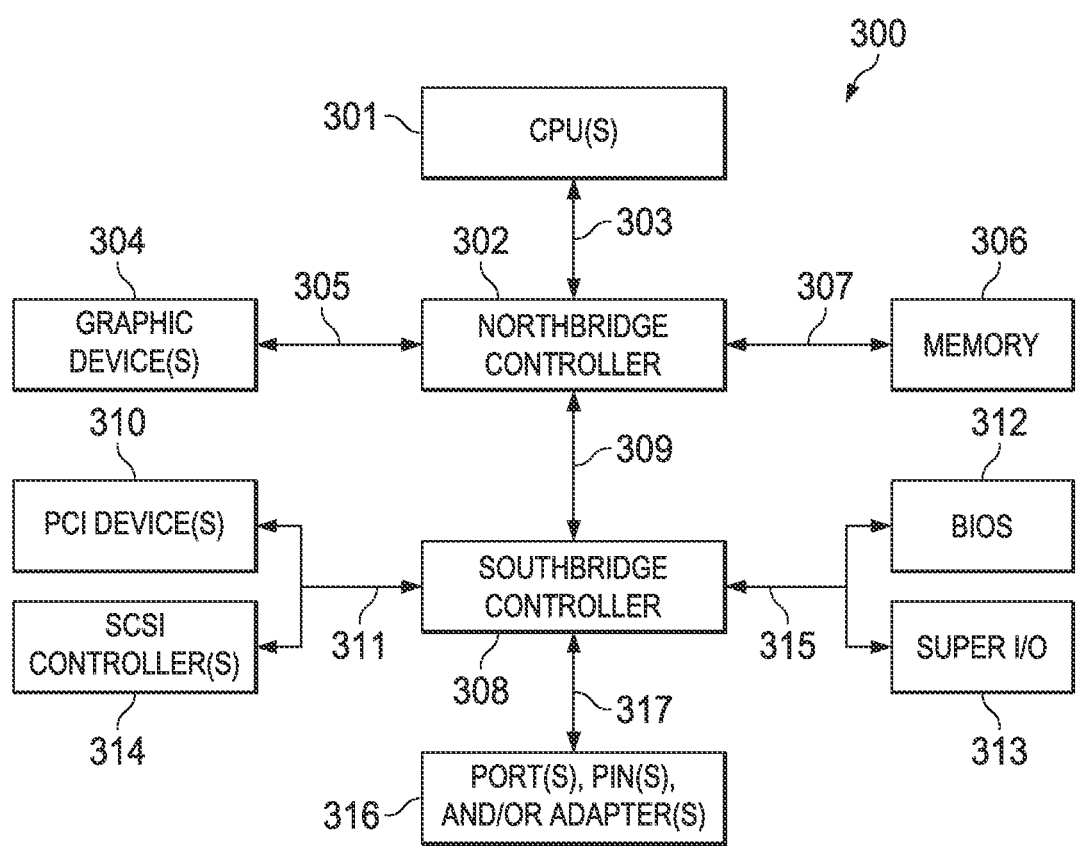
FIG. 3 is a block diagram of an example of an Information Handling System (IHS) according to some embodiments.

FIG. 3 is a block diagram of an example of an IHS. In some embodiments, IHS 300 may be used to implement any of computer systems or devices 101, 102A-N, and/or 105A-N. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, Universal Serial Bus (USB), audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 (e.g., modems, network cards, sound cards, or video cards) and to one or more SCSI controllers 314 via parallel bus 311. Southbridge controller 308 is also coupled to Basic I/O System (BIOS) 312 and to Super I/O Controller 313 via Low Pin Count (LPC) bus 315.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

Virtual Collaboration application

In various embodiments, the virtual collaboration architecture described above may be used to implement a number of systems and methods in the form of virtual collaboration application 230 shown in FIG. 2. These systems and methods may be related to meeting management, shared workspace (e.g., folder sharing control, remote desktop, or application sharing), digital whiteboard (e.g., collaboration arbitration, boundary, or light curtain based input recognition), and/or personal engagement (e.g., attention loss detection, eye tracking, etc.), some of which are summarized below and explained in more detail in subsequent section(s).

For example, virtual collaboration application 230 may implement systems and/or methods for managing public and private information in a collaboration session. Both public and private portions of a virtual collaboration workspace may be incorporated into the same window of a graphical user interface. Meeting/project content in the public and private portions may include documents, email, discussion threads, meeting minutes, whiteboard drawings, lists of participants and their status, and calendar events. Tasks that may be performed using the workspace include, but are not limited to, editing of documents, presentation of slides, whiteboard drawing, and instant messaging with remote participants.

Additionally or alternatively, virtual collaboration application 230 may implement systems and/or methods for real-time moderation of content sharing to enable the dynamic moderating of participation in a shared workspace during a meeting. Combining a contact list alongside the shared workspace and folder system in one simplified and integrated User Interface (UI) puts all input and outputs in one window so users simply drag and drop content, in-session workspace tabs, and people to and from each other to control access rights and share. Behavior rules dictating actions may be based on source and destination for drag and drop of content and user names. Actions may differ depending on whether destination is the real-time workspace or file repository. Also, these systems and methods provide aggregation of real-time workspace (whiteboard/presentation area) with file repository and meeting participant lists in one UI.

Additionally or alternatively, virtual collaboration application 230 may implement systems and/or methods for correlating stroke drawings to audio. Such systems and methods may be configured to correlate participants' audio and drawing input by synchronization of event triggers on a given device(s). As input is received (drawing, speech, or both), the data are correlated via time synchronization, packaged together, and persisted on a backend system, which provides remote synchronous and asynchronous viewing and playback features for connected clients. The data streams result in a series of layered inputs that link together the correlated audio and visual (sketches). This allows participants to revisit previous collaboration settings. Not only can a user playback the session in its entirety, each drawing layer and corresponding audio can be reviewed non-linearly.

Additionally or alternatively, virtual collaboration application 230 may implement systems and/or methods for live speech-to-text broadcast communication. Such systems and methods may be configured to employ Automatic Speech Recognition (ASR) technology combined with a client-server model and in order to synchronize the converted speech's text transcript for real-time viewing and later audio playback within a scrolling marquee (e.g., "news ticker"). In conjunction with the converted speech's text the audio data of the speech itself is persisted on a backend system, it may provide remote synchronous and asynchronous viewing and playback features for connected clients.

Additionally or alternatively, virtual collaboration application 230 may implement systems and/or methods for dynamic whiteboarding drawing area. In some cases, a virtual border may be developed around the center of a user's cursor as soon as that user starts to draw in a shared whiteboard space. The border may simulate the physical space that the user would block in front of a traditional wall-mounted whiteboard and is represented to all session participants as a color-coded shaded area or outline, for example. It provides dynamic virtual border for reserving drawing space with automatic inactivity time out and resolution with other borders, as well as moderation control of a subset of total available area, allowing border owner to invite others to draw in their temporary space, and the ability to save subsets of a digital whiteboard for longer periods of time Additionally or alternatively, virtual collaboration application 230 may implement systems and/or methods for coaching users on engagement in meetings and desk work. These systems and methods may be configured to measure a user's activity and to feedback relevant information regarding their current level of engagement. Sensors may detect activity including facial movements, gestures, spoken audio, and/or application use. Resulting data may be analyzed and ranked with priority scores to create statistics such as average speaking time and time spent looking away from screen. As such, these systems and methods may be used to provide contextual feedback in a collaborative setting to monitor and to improve worker effectiveness, ability to set goals for improvement over time, such as increased presence in meetings and reduced time spent on low-priority activities, combined monitoring of device and environmental activity to adapt metrics reported based on user's context, and ability for user to extend to general productivity improvement.

Additionally or alternatively, virtual collaboration application 230 may implement systems and/or methods for automated tracking of meeting behavior and optimization over time. Such systems and methods may act as a planning tool configured to leverage device sensors, user calendars, and/or note-taking applications to track user behavior in meetings and suggest optimizations over time to increase overall effectiveness. As such, these systems and methods may leverage device proximity awareness to automatically track user attendance in scheduled meetings over time and/or use ASR to determine participation levels and mood of meetings (e.g., assess whether attendance is too high, too low, and general logistics).

Additionally or alternatively, virtual collaboration application 230 may implement systems and/or methods for managing meeting or meeting topic time limits in a distributed environment. A meeting host service may provide controlled timing and notification of meeting events through use of contextual information such as speaker identification, key word tracking, and/or detection of meeting participants through proximity. Meeting host and individual participants may be notified of time remaining prior to exceeding time limits. Examples include, but are not limited to, time remaining for (current) topic and exceeding preset time-to-talk limit. In some cases, these systems and methods may be configured to perform aggregation of contextual data with traditional calendar, contact, and agenda information to create unique meeting events such as identifying participants present at start and end of meeting (e.g., through device proximity). Such systems and methods may also be configured to use of contextual data for dynamic management of meeting timing and flow in a distributed environment, and to provide contextual-based feedback mechanism to individuals such as exceeding preset time-to-talk.

Additionally or alternatively, virtual collaboration application 230 may implement systems and/or methods for enhanced trust relations based on peer-to-peer (P2P) direct communications. In many situations people whom have not met in person may be in communication with each other via email, instant messages (IMs), and through social media. With the emerging P2P direct communications, face-to-face communication may be used as an out-of-band peer authentication ("we have met"). By attaching this attribute in a user's contact list, when the user is contacted by other people whose contact information indicates that they have interacted face-to-face, these systems and methods may provide the user a higher level of trust.

Additionally or alternatively, virtual collaboration application 230 may implement systems and/or methods for a gesture enhanced interactive whiteboard. Traditional digital whiteboard uses object size and motion to detect if a user intending to draw on the board or erase a section of the board. This feature can have unintended consequences, such as interpreting pointing as drawing. To address this, and other concerns, these systems and methods may augment the traditional whiteboard drawing/erase detection mechanism, such as light curtain, with gesture recognition system that can track the user's face orientation, gaze and/or wrist articulation to discern user intent.

Additionally or alternatively, virtual collaboration application 230 may implement systems and/or methods for hand raise gesture to indicate needing turn to speak. It has become very commonplace to have remote workers who participate in conference call meetings. One key pain point for remote workers is letting others know that they wish to speak, especially if there are many participants engaged in active discussion in a meeting room with a handful or few remote workers on the conference call. Accordingly, these systems and methods may interpret and raise gesture that is detected by a laptop web cam as automatically indicating to meeting participants that a remote worker needs or wants a turn to speak.

Additionally or alternatively, virtual collaboration application 230 may implement systems and/or methods for providing visual audio quality cues for conference calls. One key pain point anyone who has attended conference calls can attest to is poor audio quality on the conference bridge. More often than not, this poor audio experience is due to background noise introduced by one (or several) of the participants. It is often the case that the specific person causing the bridge noise is at the same time not listening to even know they are causing disruption of the conference. Accordingly, these systems and methods may provide a visual cue of audio quality of speaker (e.g., loudness of speaker, background noise, latency, green/yellow/red of Mean opinion score (MOS)), automated identification of noise makers (e.g., moderator view and private identification to speaker), and/or auto muting/filtering of noise makers (e.g., eating sounds, keyboard typing, dog barking, baby screaming).

Managing Public and Private Information in a Virtual Collaboration Session

During a virtual collaboration session it can be cumbersome and confusing for a user to manage separation between content that is being shared publically with other meeting participants and content they want to keep private. When using a projector, for example, participants who want privacy must either disconnect the projector temporarily or leverage the extended monitor function. The latter is a cumbersome process that many do not take the time to learn or use on a regular basis and so they are left with the risk of privacy violation. When sharing online via a screen sharing application or the like, a participant must maximize and minimize windows in order to toggle between the shared space and private content.

Desktop and application sharing common to Unified Communication (UC) platforms such as Lync®, WebEx®, and GoToMeeting® manage privacy by sharing particular applications. In those environments, typically one user broadcasts information to many users and everything in that space is public, with any other information being rendered in other discrete windows. The moderator has control and the entire session needs to be switched over for another user to share their desktop or application. Content developed by an individual in private cannot be easily merged into a shared workspace session, and those applications that support it require manual cutting and pasting.

To address these, and other issues, a virtual collaboration application may include systems and methods for managing public and private information in a collaboration session. In this context, a virtual collaboration workspace is a content aggregation system that allows a participant and team to organize and share materials for a meeting or a project in a single window for a dashboard view. This technique enables users to perform common tasks without leaving the workspace. Meeting and/or project materials can include, but are not limited to, documents, email, discussion threads, meeting minutes, whiteboard drawings, lists of participants and their status, calendar events, etc. Tasks that may be performed from within the virtual collaboration application include, but are not limited to, editing of documents, presentation of slides, whiteboard drawing, and/or instant messaging with remote participants, among others.

Figure 4:
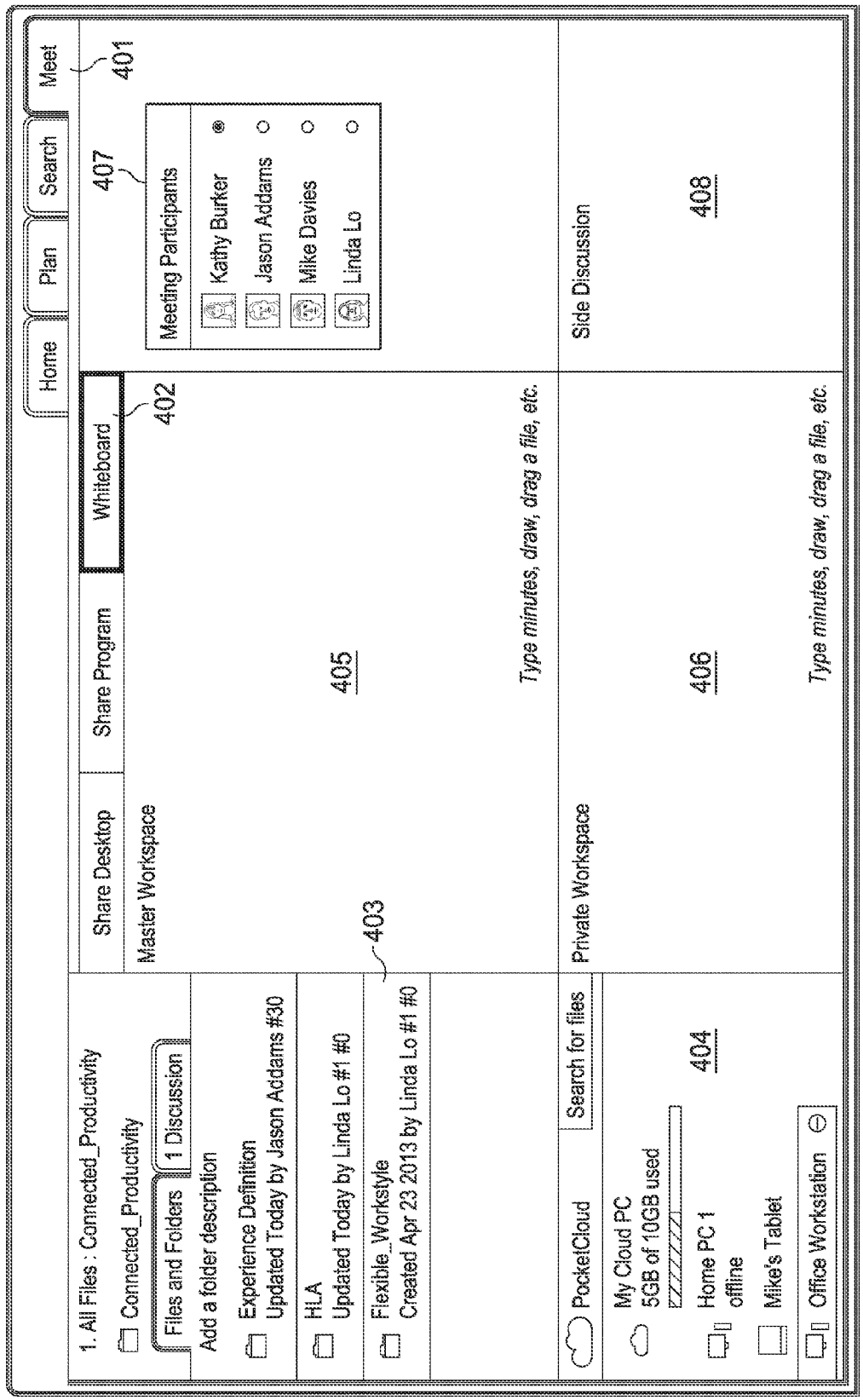
FIG. 4 is a screenshot of public and private portions of a virtual collaboration workspace rendered by a participant's device according to some embodiments.

In that regard, FIG. 4 is screenshot 400 of public and private portions of a virtual collaboration workspace rendered by a participant's device according to some embodiments. Particularly, public portion 405 and private portion 406 are rendered concurrently in the same window of a graphical representation of virtual collaboration workspace. As shown, portions 405 and 406 are displayed as part of "meet" tab 401 of the virtual collaboration application, upon selection of whiteboarding operations 402.

As shown, public portion 405 (the top pane) is a shared workspace linked to the project repository and private portion 406 (the bottom pane) is a private workspace for a participant to vet ideas and preview content before sharing. The top pane is common to every participant's system and is also routed to the projector or host device. All users connected in a session have equal rights to see tabs of content in public portion 405, both on their respective devices and any attached display, such as a projector. Public portion 405 may also include the team's shared repository 403. Shared repository 403 may be configured as a document object store. Each participant has their own corresponding private portion 406 to develop ideas and access personal content though their personal file ecosystem 404. Having this private space in the same window as the public space allows users to navigate content with assurance that it is not being broadcast to other participants.

A list or roster of participants 407 may indicate, to each given participant, which other participants are currently attending the same session and have access to content placed in public portion 405 and/or public file system 403. In some embodiments, participants listed in area 408 are indicated as having access to the given participant's private portion 406 and/or private file system 404, as discussed in more detail below.

Figure 5:
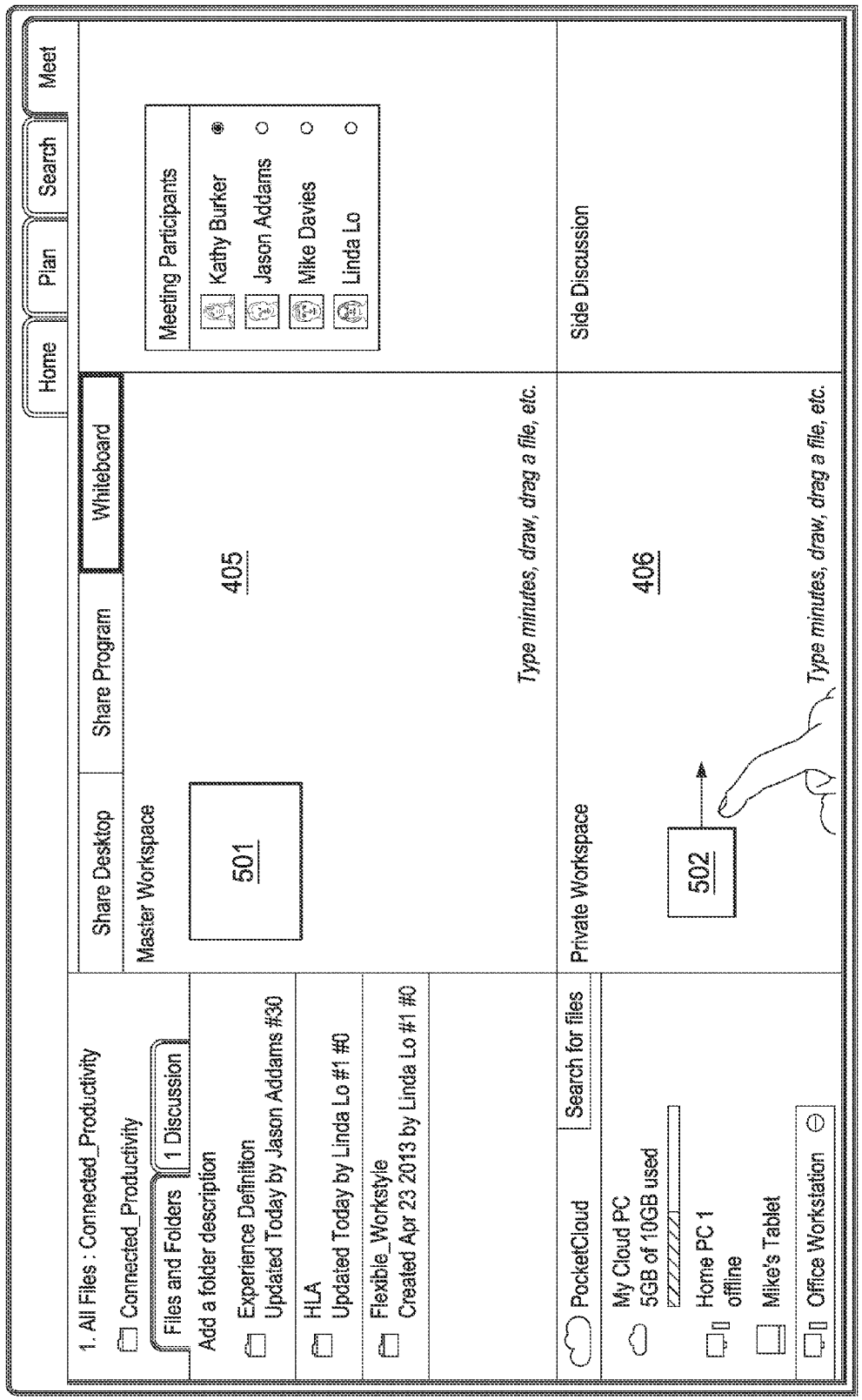
FIG. 5 is a screenshot illustrating the sketching of ideas in a private portion of a virtual workspace according to some embodiments.

FIG. 5 shows screenshot 500 illustrating the sketching of ideas in a private portion of a virtual workspace according to some embodiments. Particularly, private portion 406 is especially attractive for digital whiteboarding because a participant may sketch content and ideas 502 in private, before sharing them with the team via public portion 405, as has been done with content 501 in this example.

Figure 6:
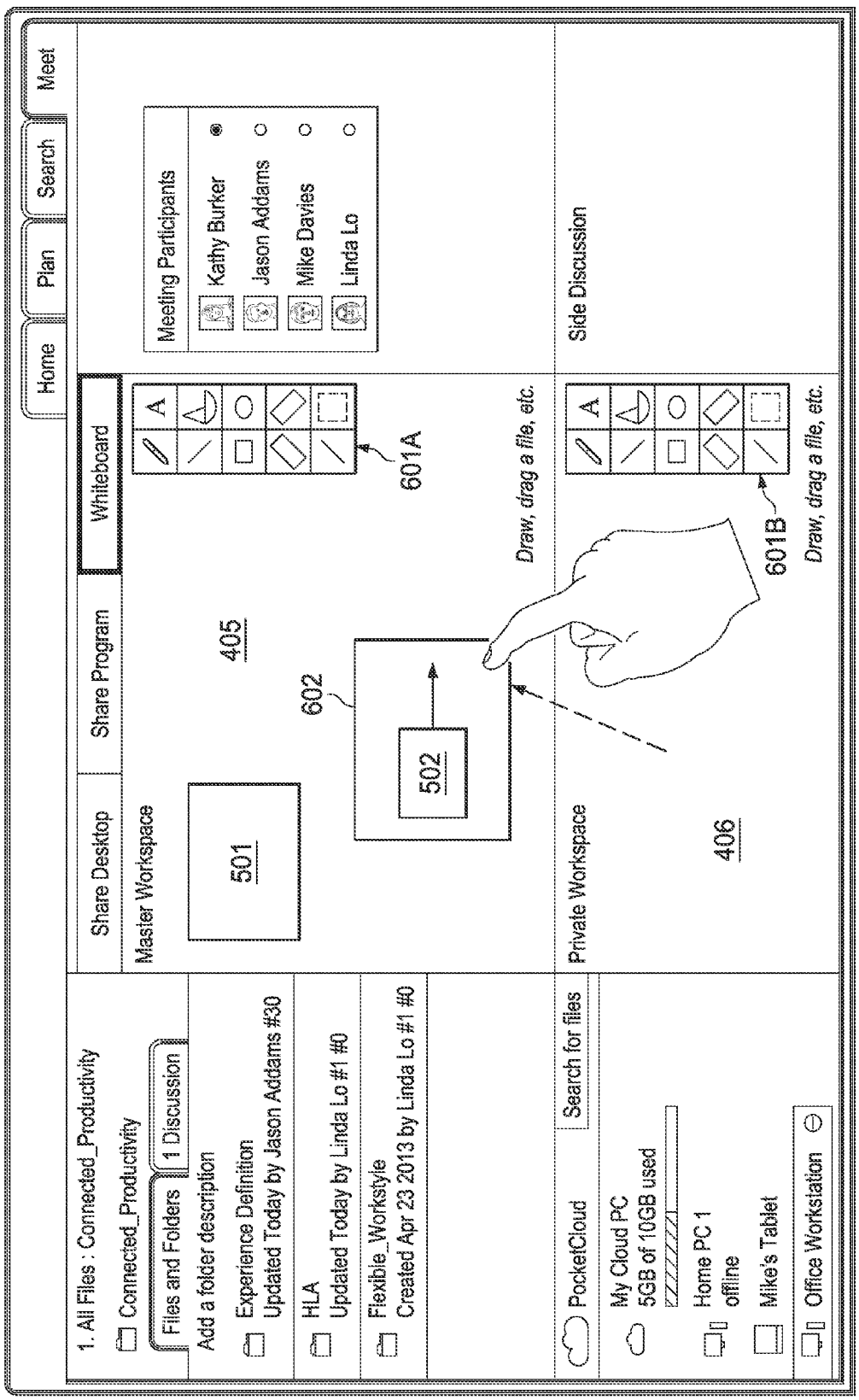
FIG. 6 is a screenshot illustrating lassoing of a sketch and moving the sketch to the public portion of the workspace according to some embodiments.

FIG. 6 shows screenshot 600 illustrating lassoing of a sketch and moving the sketch to the public portion of the workspace according to some embodiments. When ready to promote content 502 to the public realm, the participant simply lassos it using tool 602 from palette 601A or 601B, and drags content 502 into public portion 405. In some cases, the participant may draw a "sticky note" frame around the private content, and drag it form the personal workspace to the public workspace using a touch screen gesture, a pointing device, or the like.

Figure 7:
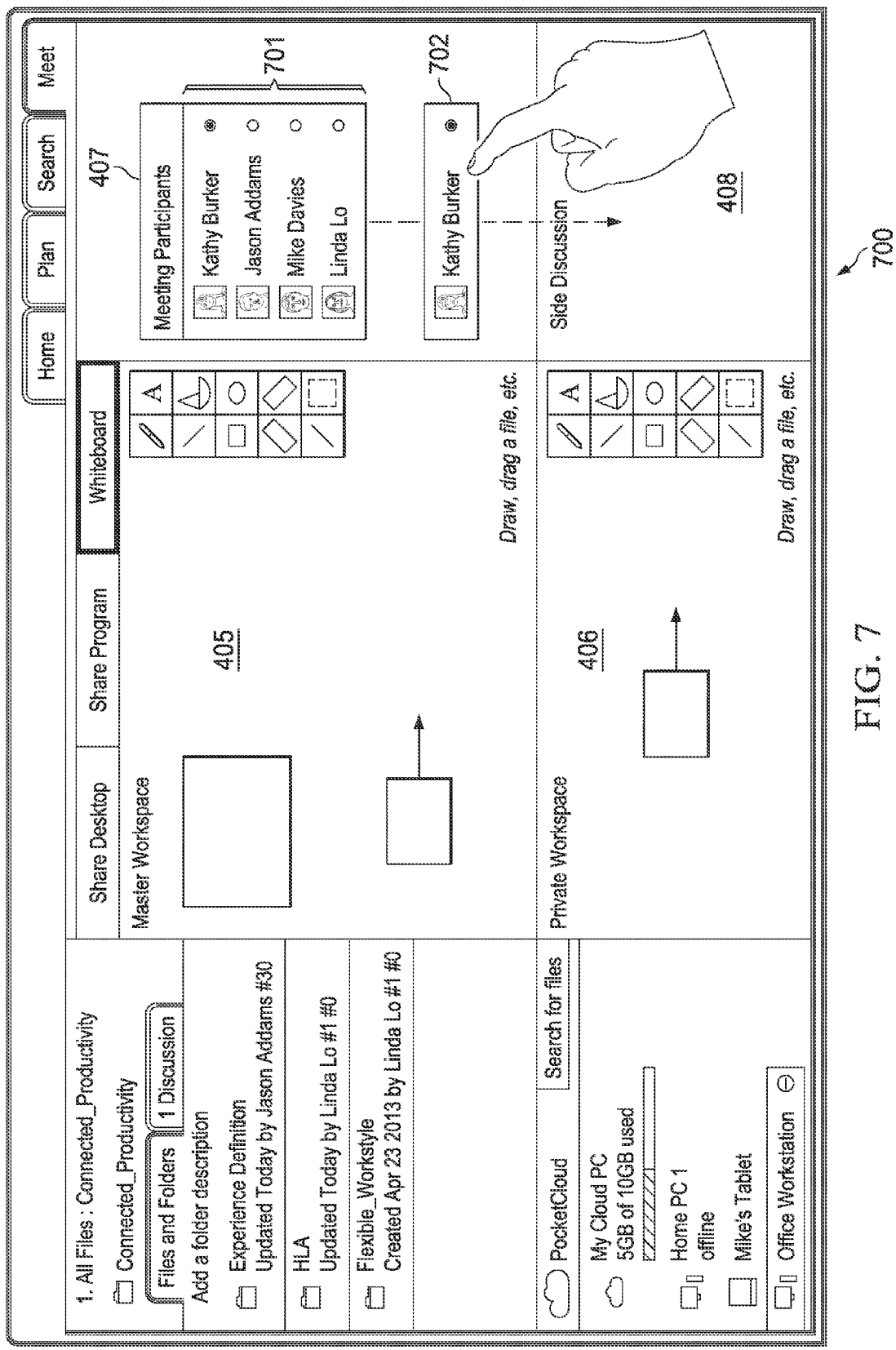
FIG. 7 is a screenshot illustrating the adding of participants from a main attendance roster into a private portion of a workspace according to some embodiments.

FIG. 7 shows screenshot 700 illustrating the adding of participants from main attendance roster 701 into private portion 408 of a workspace according to some embodiments. In some cases, users can also invite others into their private workspace by dragging and dropping their names from the meeting participants list. A first participant may select a second participant 702 from roster 701 shown in public portion 407, and may drag the second participant 702 to area 408.

Once listed in area 408, the first and second participants may then perform collaboration operations within the first user's private portion 406 of the workspace.

Generally speaking, the virtual collaboration workspace shown in FIGS. 4-7 may be unique and linked to a specific collaboration environment (e.g., a meeting or project). These objects may be any type of binary data such as a document file (e.g., Word®, PDF), image, audio file, or text. The storage mechanism may provide data persistence with read and write access privileges in the form of an access control list. An implementation may include, for example, a Storage Area Network (SAN), a Network Attached Storage Device, a distributed database or cache, or the like. Other implementations may include external repositories, such as SharePoint® or a cloud service such as Box.net®

Figure 8:
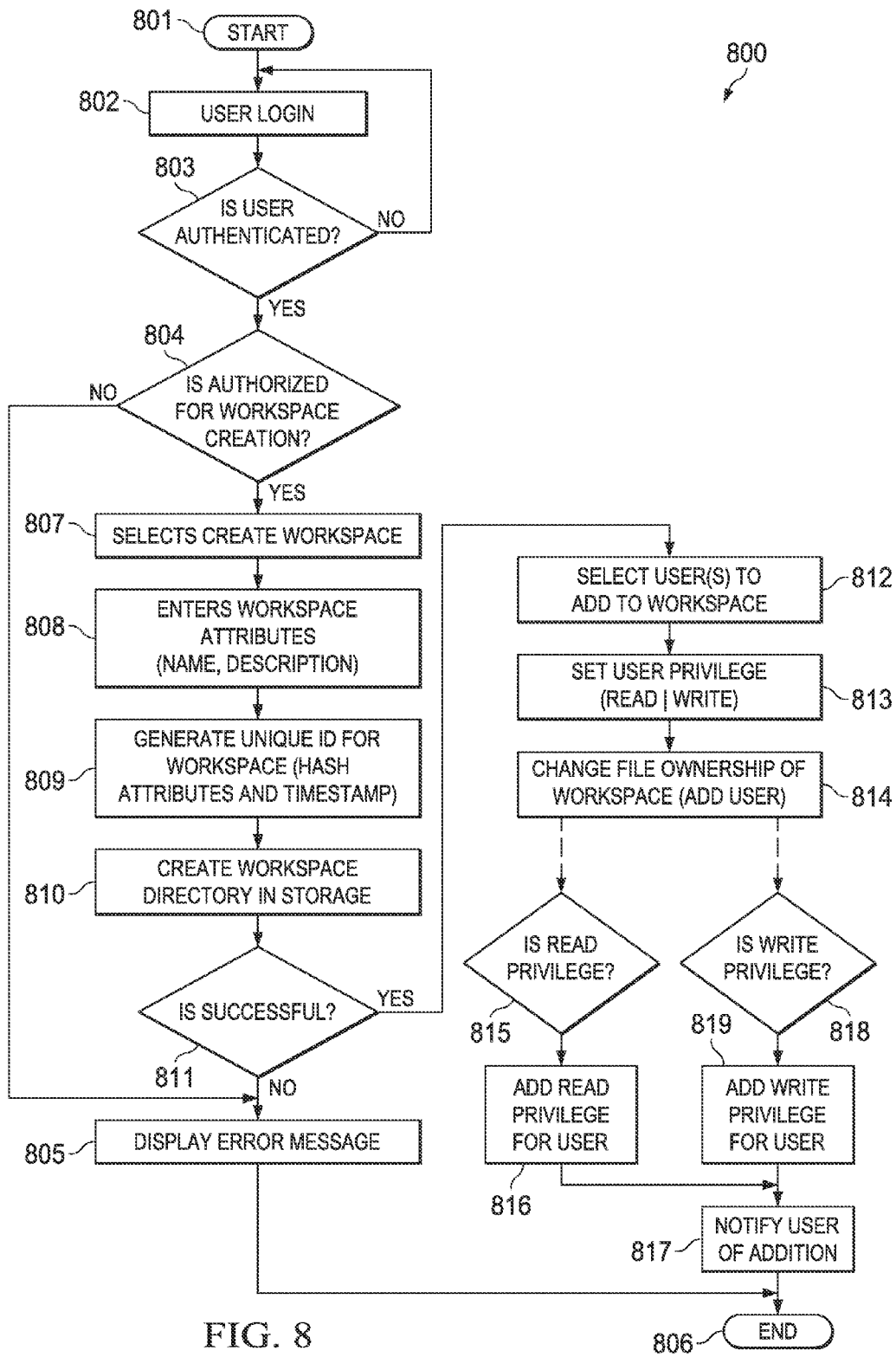
FIG. 8 is a flowchart of a method for creating a shared workspace and authorizing users for various levels of content access according to some embodiments.

FIG. 8 is a flowchart of a method for creating a shared workspace and authorizing users for various levels of content access according to some embodiments. Method 800 begins at block 801, and a user or participant logs in at block 802, for example, by providing a username or password to security and manageability module 207 of client platform 202 shown in FIG. 2. At block 803, method 800 determines whether the user is authenticated. If not, control returns to block 802. Otherwise, at block 804, method 800 determines whether the user is authorized for workspace creation. If not, method 800 displays an error message at block 805, and the method ends at block 806.

If the user is authorized, he or she may opt to create a shared workspace at block 807, for example, by interacting with meeting management module 214 of server platform 213. At block 808, the user may enter workspace attributes, such as workspace name, description, or the like. At block 809, method 800 may generate a unique identification for the workspace, for example, based on a hash of the provided attributes and/or a timestamp. Then, at block 810, method 800 may include creating a workspace directory or folder in persistent storage (e.g., a third party system 233 or other database 229).

In some cases, block 810 also includes allowing the user to upload or otherwise select content to be added to the shared workspace. Block 811 determines whether creation of the workspace directory or folder is successful. If not, then method 800 displays an error message at block 805, and the method ends at block 806. If the workspace directory or folder is successfully created, however, then at block 812 method 800 allows the user to select other participants to be added to the workspace. At block 813, the user may then set the other participant's read/write privileges in the form of an access control list. For example, such an access control list may include a plurality of entries, each entry associated with a particular user and/or file, and indicating whether the user has the ability to (i) read, (ii) write, or (iii) read and write to that specific file.

At block 814, method 800 includes allowing the user to change file ownership of the shared workspace, for example, by adding other participants. If the other participant has read privilege in block 815, then the corresponding privilege is added for the user in the access control list at block 816. Additionally or alternatively, if the other participant has write privilege in block 818, then the corresponding privilege is added for the user in the access control list at block 819. At block 817, the other participant may be notified of his or her addition to the workspace, and the method may end at block 806.

In sum, when a shared workspace is created and members are invited to the space, a group is created with the organizer as the owner, and invitees as participant members of the workspace. The owner may add and remove users from the workspace. The workspace maintains an access control list of each piece of content stored in the workspace. In some implementations, when a user adds content to his or her corresponding private portion within the shared workspace, it may limit the access only to the user's private group, and the user who added the file is the only default member initially. If a user adds content to the public portion within the shared workspace, it may allow access to all members of the workspace.

When a user drags a piece of content from the private space to the public space, the access control list entry for that content may be changed to allow all members of the workspace access to it. When a user drags another person into a private space, that person may be added to that user's private group, and therefore that person may have access to all of the user's private content in the workspace. To display content (e.g., to a projector, or share the app to remote user) the content must be in the public portion of the shared workspace.

Managing Content Sharing in a Virtual Collaboration Session

Despite the wealth of available in-meeting technology, workflows for real-time sharing of content within teams can be cumbersome. For example, for traditional wired projectors, users must manually swap the cable from one machine to the next merely to share content to the screen, or users swap ideas with external memories or emailing large files to the current presenter. Wireless projectors with inputs and picture-in-picture capability, but setup and moderator control are often not intuitive. Users must switch between different applications and windows in order to find information and select who to share it with both in session and after the meeting. Users also typically leverage completely different workflows for sharing during meetings and during desk work. This complexity creates issues when users must remember to distribute presentation materials after meetings.

To address these, and other problems, certain systems and methods described herein may enable the use of drag-and-drop point or touch gesturing to the ease of authorization access, giving (passing) control, and multi-party editing through the use of simple gestures, thus creating the ability to easily provide authorization access, pass control during a live meeting setting, and provide easy multi-party editing of content without a myriad of confusing and time-consuming operations.

For example, in some cases, dragging a tab of workspace content active in the session to another person in the meeting contact list gives that individual moderator control of that content in the session. Conversely, dragging that same individual to the workspace tab adds them as an editor for simultaneous editing.

In other cases, dragging a file to an individual sends that file to them while appropriately applying read access authorization control for that specific user to view the file's content. Dragging a file to a file folder uploads that file to the repository. The file may automatically inherit the authorization privileges defined by that existing parent folder. Dragging a file to the shared workspace automatically presents that content on all individuals' workspaces and the projector (if connected). Existing users participating in that shared workspace are automatically granted file (read) access for content viewing.

Figure 9:
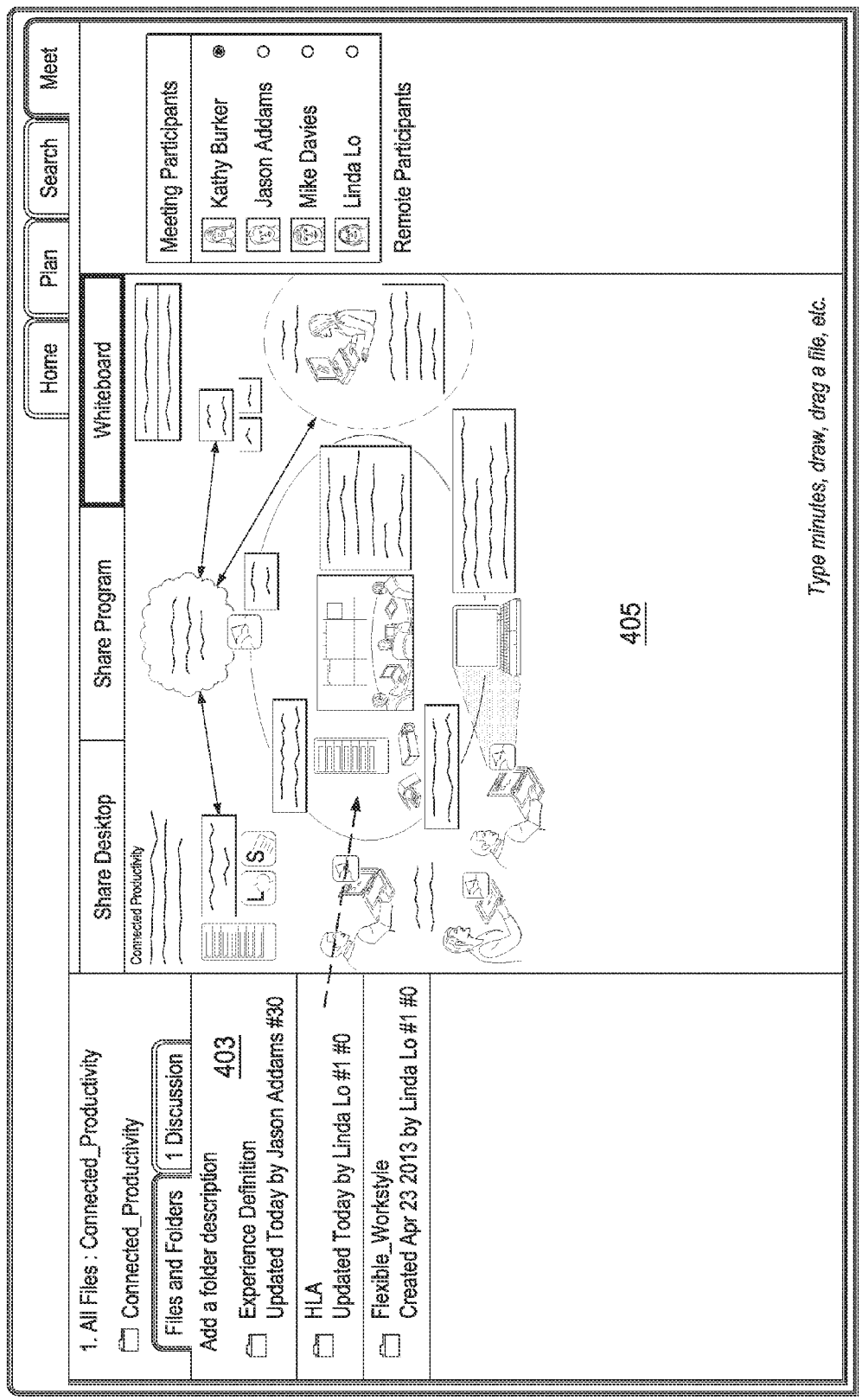
FIG. 9 is a screenshot illustrating content sharing via drag-n'-drop according to some embodiments.

In that regard, FIG. 9 shows screenshot 900 illustrating content sharing via drag-n'-drop according to some embodiments. Particularly, content may be shared by dragging it from file list 503 into public portion 505. In some cases, double clicking on a piece of content may maximize that window to full presentation mode.

Figure 10:
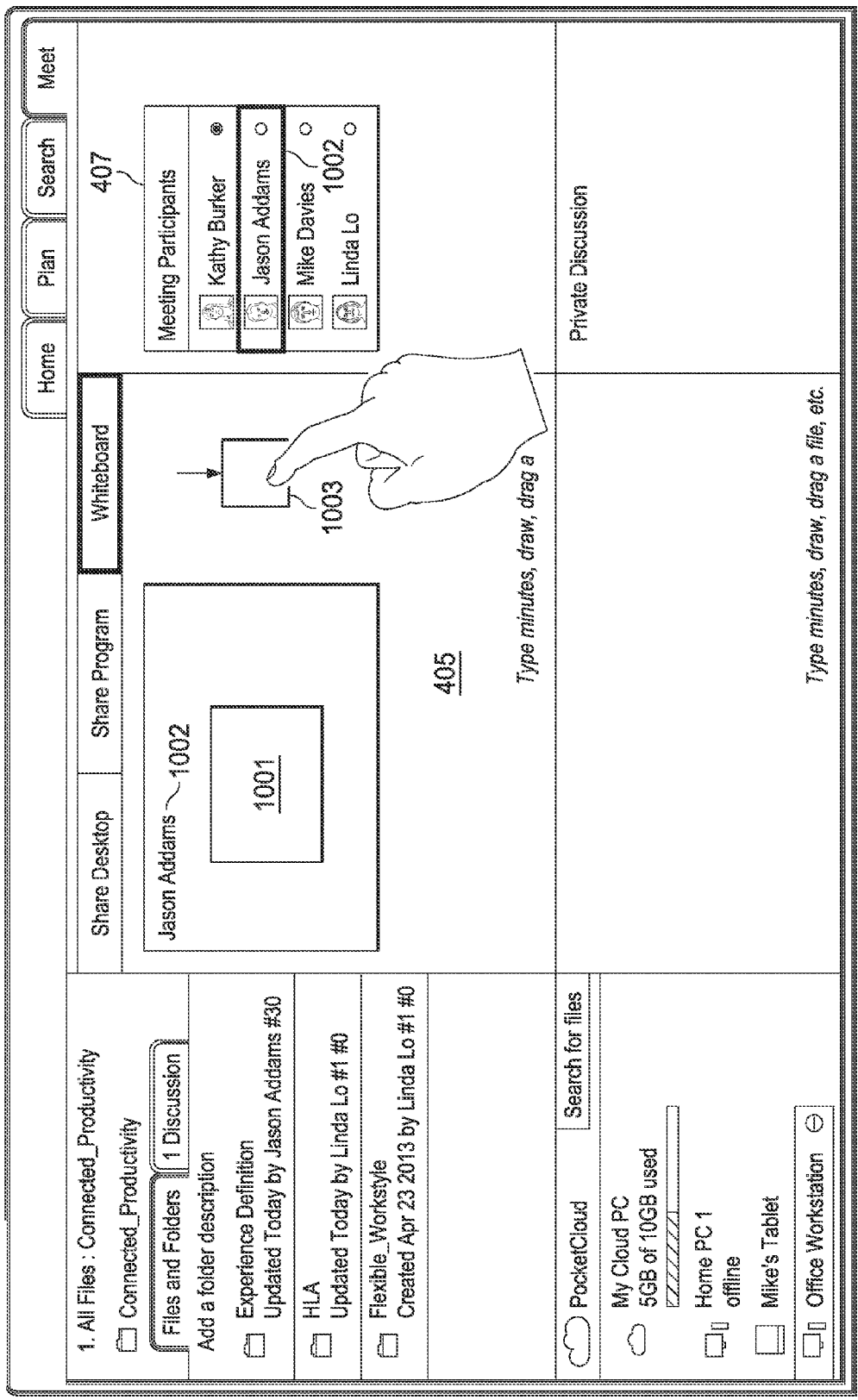
FIG. 10 is a screenshot illustrating the addition of a participant as editor according to some embodiments.

FIG. 10 shows screenshot 1000 illustrating the addition of a participant as editor according to some embodiments. In some cases, as soon as a given participant begins to draw on public portion 405 of the virtual whiteboard, other users see a color-coded virtual border around the participant's sketch 1003. In some cases, visual features or cues other than color-coding may be used to identify the border such as, for example, a pattern or the like. Other participants cannot draw within the border until the given participant stops drawing and/or a time out expires. In this scenario, another participant identified by tag 1002, also shown in participant list 407, is drawing sketch 1001 in the shared workspace simultaneously, but cannot interfere with the given participant's drawing 1003 until the given participant finishes his or her operations. Conversely, the given participant cannot interfere with the other participant's drawing of sketch 1001.

Figure 11:
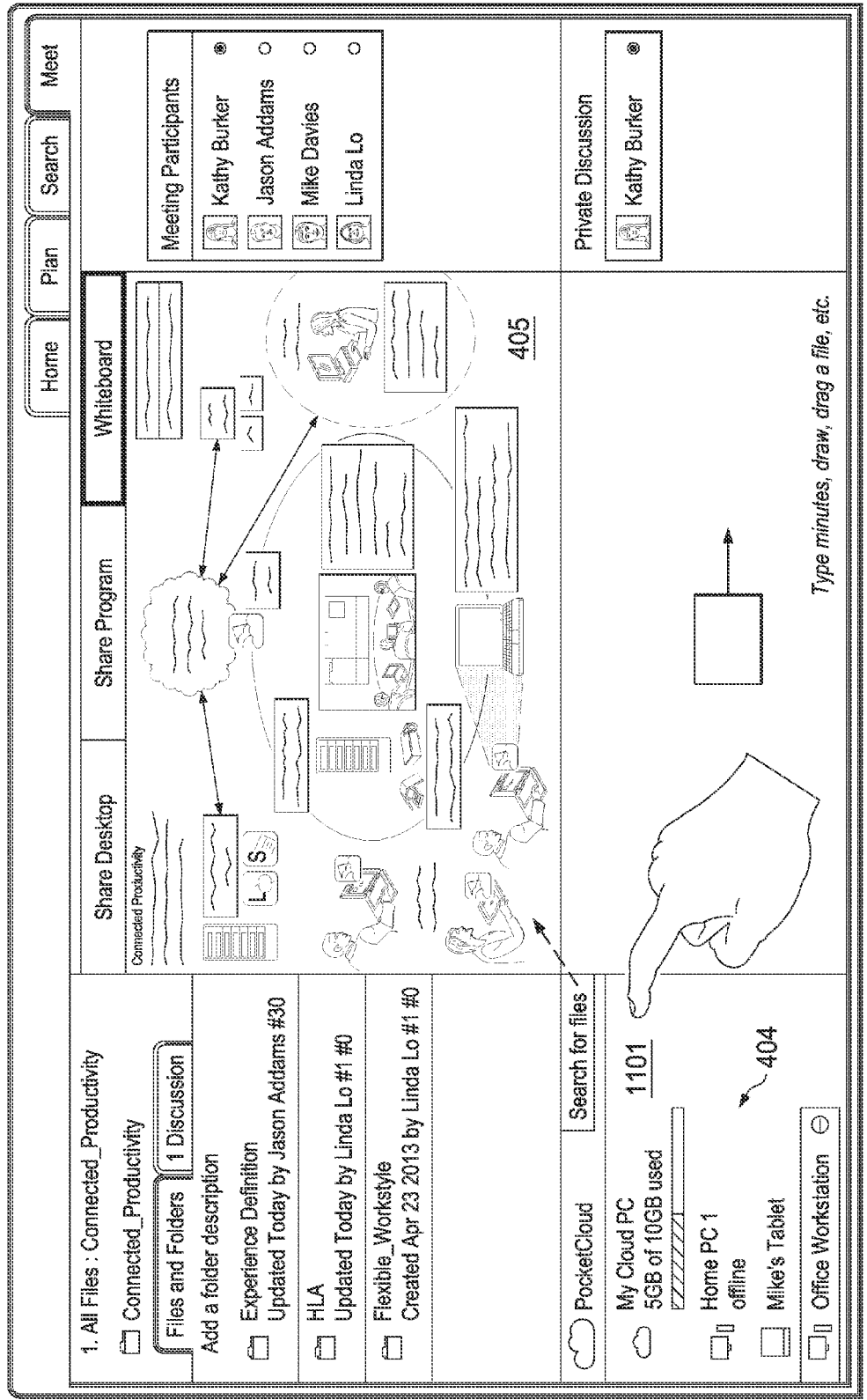
FIG. 11 is a screenshot illustrating the sharing of content with selected participants via drag-n'-drop according to some embodiments.

FIG. 11 shows screenshot 1100 illustrating the sharing of content with selected participants via drag-n'-drop according to some embodiments. Having content and contact alongside private and public portions of the workspace in a unified application allows for greatly simplified sharing workflows, allowing a participant to simply drag content or contacts between to connect, share, provide permissions, etc. Here, a participant may drag a file from private file repository window 404 to public portion 405 to share that file with all other participants.

Figure 12:
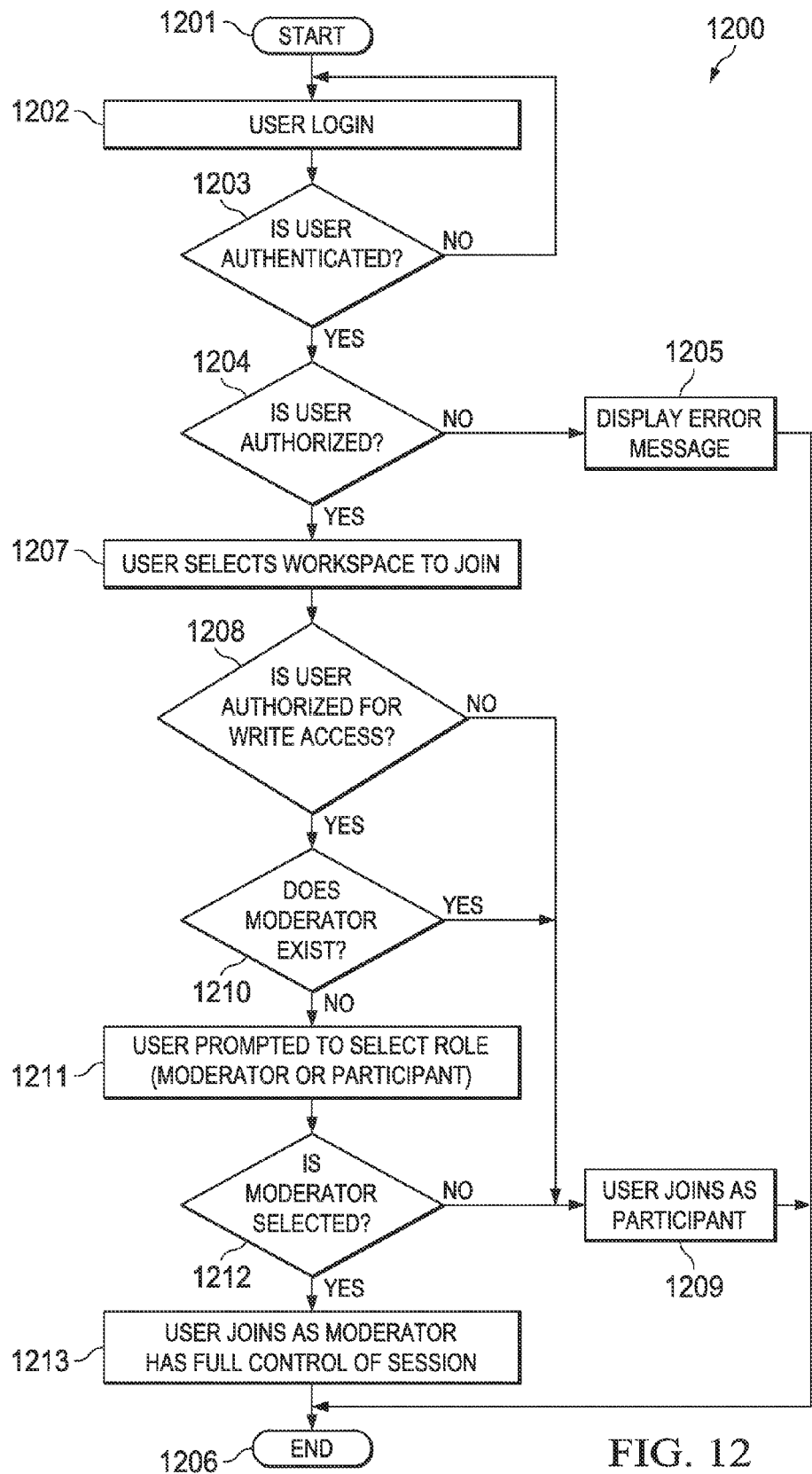
FIG. 12 is a flowchart of a method for joining a workspace as a moderator according to some embodiments.

FIG. 12 is a flowchart of a method for joining a workspace as a moderator according to some embodiments. Method 1200 begins at block 1201, and a user or participant logs in at block 1202, for example, by providing a username or password to security and manageability module 207 of client platform 202 shown in FIG. 2. At block 1203, method 1200 determines whether the user is authenticated. If not, control returns to block 1202. Otherwise, at block 1204, method 1200 determines whether the user is authorized to join a workspace. If not, method 1200 ends at block 1206.

If the user is authorized, he or she may select a shared workspace to join at block 1207, for example, by interacting with meeting management module 214 of server platform 213. At block 1208, method 1200 may determine whether the user is authorized for write access, for example, by consulting an access control list associated with workspace content. If not, then meeting management module 214 allows the user to join the workspace as a participant in block 1209, and the method ends at block 1206.

If the user has write access, then method 1200 determines whether a moderator already exists for the shared workspace at block 1210. If not, meeting management module 214 again allows the user to join the workspace as a participant in block 1209, and the method ends at block 1206. Otherwise, method 1200 includes prompting the user to select his or her role in the virtual collaboration session, for example, as a moderator or ordinary participant at block 1211.

At block 1212, if the user selects to join the workspace as a participant, meeting management module 214 again allows the user to join the workspace as such in block 1209, and the method ends at block 1206. Conversely, if the user selects to join the workspace as a moderator, method 1200 includes allowing the user to join as such and gives that user full control of the collaboration session at block 1213, after which the method ends a block 1206.

Figure 13:
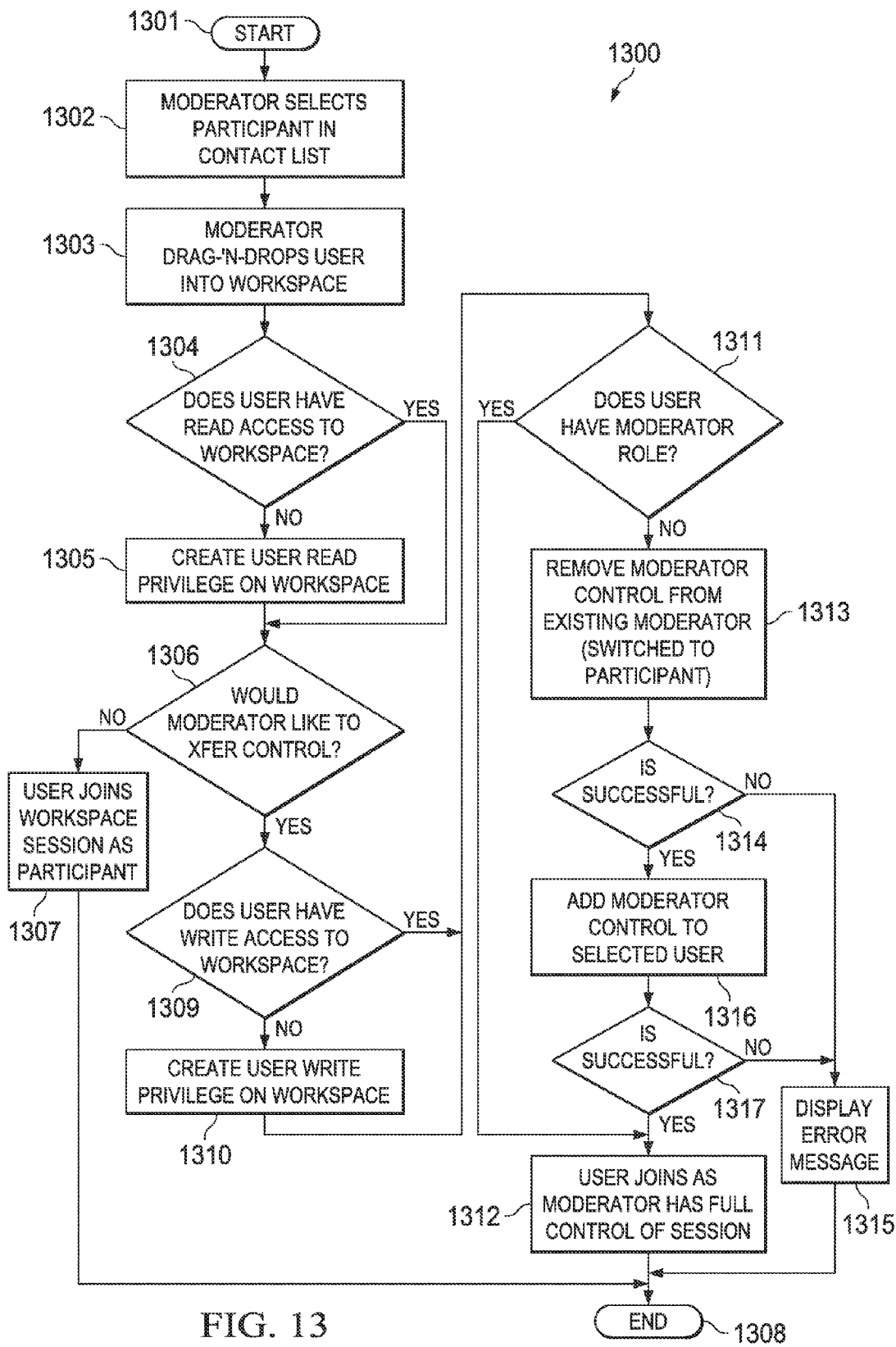
FIG. 13 is a flowchart of a method for transferring session control between users according to some embodiments.

FIG. 13 is a flowchart of a method for transferring session control between users according to some embodiments. Particularly, method 1300 illustrates the flow of session moderation and how an authorized user can easily pass control to another user via a simple drag-n-drop gesture or the like. Conversely, participants may be linked with selected content for one-to-many sharing capabilities.

Method 1300 begins at block 1301. At block 1302, a moderator selects a participant from his or her contact list, and at block 1303 the moderator drags and drops the user into the workspace. At block 1304, method 1300 determines whether the user has read access to the workspace. If not, block 1305 creates a user read privilege on the workspace's access control list. At block 1306, method 1300 determines whether the moderator would like to transfer control to the user. If not, the user joins the workspace as a participant at block 1307 and the method ends a block 1308. Otherwise, block 1309 determines whether the user has write access to the workspace. If not, block 1310 creates a user write privilege on the workspace's access control list.

At block 1311, method 1300 determines whether the user has moderator role. If so, then the user joins the session as moderator with full control at block 1312, and the method ends at block 1308. If not, then block 1313 removes moderator control from the existing moderator at block 1313. If method 1300 determines that the operation(s) of block 1313 were successful at block 1314, block 1316 adds moderator control to the selected user. If method 1300 determines that the operation(s) of block 1316 were successful at block 1317, then the user joins the session as moderator with full control at block 1312, and the method ends at block 1308. Conversely, if either blocks 1314 or 1317 determines a failure, block 1315 displays an error message and method 1300 ends at block 1308.

In sum, combining a contact list alongside the shared workspace and folder system in one simplified and integrated user interface puts all input and outputs in one window so users simply drag and drop content, in-session workspace tabs, and people to and from each other to control access rights and share. The drag-and-drop motion makes it touch friendly for tablets and interactive projectors. Behavior rules may dictate what is being dragged, where it is dropped, and the appropriate authorization privileges (read/write) to apply for sharing content across users or participants. As such, the systems and methods described above enable dynamic moderation control of in-session content, in contrast to asynchronous files sharing.

Managing Drawing Areas on a Shared Whiteboard

Adoption of whiteboarding in virtual collaboration sessions has been limited for a number of reasons. First, a user's interactions with a virtual whiteboard appear unnatural when compared to being co-located in a room and physically drawing on a board with pen in hand. In many cases, co-located meeting participants tend to choose traditional methods of communication, and remote meeting participants are left out of whiteboard sessions.

Another problem with a virtual whiteboard involves managing ownership of multiple users' drawing areas. With a traditional wall-mounted whiteboard in a conference room, the person drawing on the board physically blocks others out from drawing in the same space at the same time. In a virtual whiteboard, however, multiple users are often able to draw over each other's ideas. In an attempt to circumvent this problem, the virtual collaboration workspace may be configured to lock access to the virtual whiteboard to a single user at a time, but that results in the lack of simultaneous collaboration from other participants.

Figure 14:
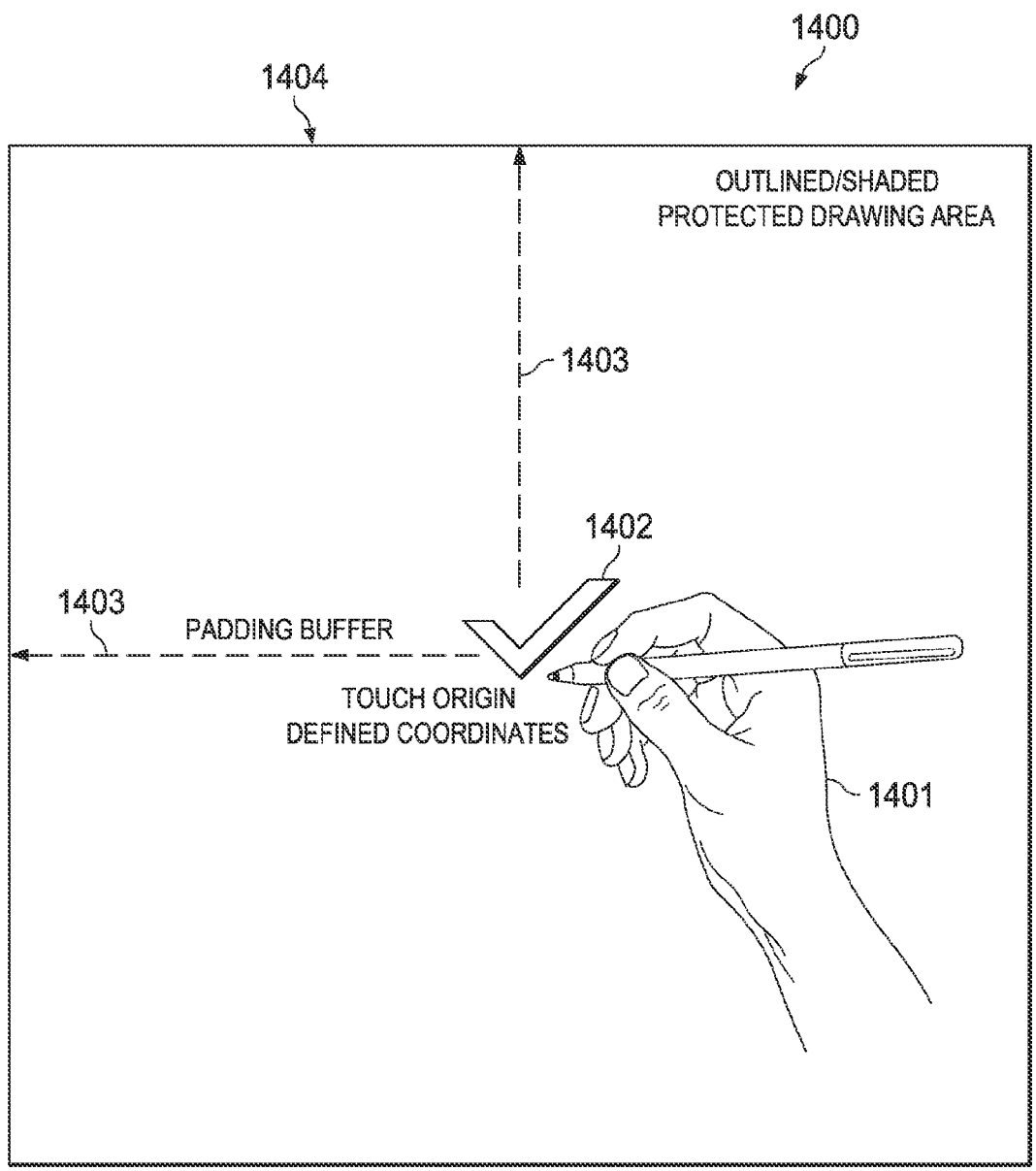
FIG. 14 is a diagram of a protected area for a virtual whiteboard according to some embodiments.

To address these, and other concerns, certain systems and methods described herein may include a whiteboarding application such that, so long as an initiating user is drawing within their reserved space, other users cannot draw within it. An outlined area may acts as a padded buffer, preventing other participants from invading the space and simultaneously drawing over the user. To illustrate the foregoing, FIG. 14 is a diagram of a protected area for a virtual whiteboard according to some embodiments. As shown, user 1401 touches an initial point 1402 (with a pen, finger, mouse, trackpad, or the like) of whiteboarding area 1400, thus creating protected area 1404 having padding buffer 1403.

Again, protected area 1404 may be such that other users are not allowed to draw within its boundaries. Area 1404 may have a square or rectangular shape, although any other suitable shape (e.g., circular) may be used.

In some cases, area 1404 may have a fixed size that remains fixed around the initial touch down spot 1402 for the drawing cursor. In that situation, the user may be capable of drawing outside of area 1404 and into area 1400, as they would by reaching across a physical whiteboard, but the strokes outside of reserved space 1404 are not protected and can be simultaneously drawn over by others. In other cases, area 1404 may have a size adjustable by the user, for example, by manipulating its boundaries to reserve more or less space than initially allocated. In yet other cases, depending upon the size of a predetermined number of strokes, area 1404 may be automatically increased or decreased in the absence of user intervention.

In some embodiments, different users may reserve their own respective areas on the shared whiteboard to simultaneously sketch out their ideas. Users may then be allowed to draw within the same virtual whiteboard's canvas without interfering with other participants' drawings. When the owner of a given area stops drawing, the border around that area may time out and disappear, so others can then add their ideas to the content within the same previously blocked outlined area.

Figure 15:
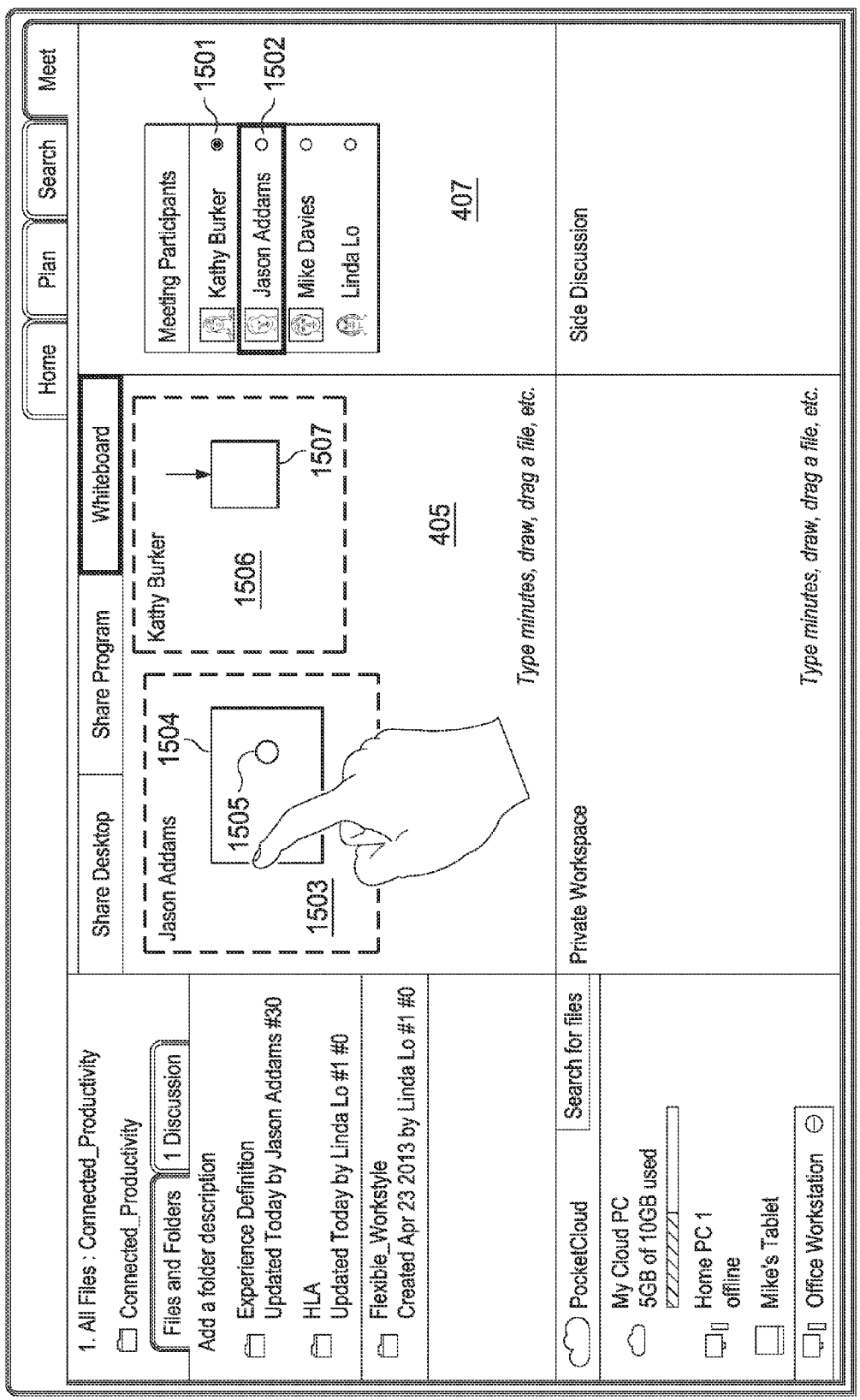
FIG. 15 is a screenshot illustrating protected areas on a shared whiteboard according to some embodiments.

FIG. 15 is a screenshot illustrating protected areas on a shared whiteboard according to some embodiments. As soon as user 1502 starts to draw FIG. 1504 on shared digital whiteboard 405, virtual border 1503 develops around the center 1505 of their cursor. Other users can not draw in area 1503 until the initiator stops drawing long enough for the border to time out. In this example, another user 1501 is drawing simultaneously outside of the initiator's border and has their own reserved drawing space 1506 surrounding FIG. 1507. No other meeting participants can draw in spaces 1503 or 1506 until their respective owners are finished drawing out their ideas. In some cases, area 1503 may be color coded to match the color of participant's name 1502, and area 1506 may be color coded to match the color of participant's name 1501 on participant list 407.

If the initiator of a given drawing area wishes for another user to be able to draw simultaneously in their reserved space, the initiator may drag the other user's name from the meeting participant list and into that given area. Similarly, the owner of a reserved drawing space may drag the space to another user to pass ownership of that space. In some cases, if a new user starts sketching immediately outside of another user's reserved space, the conflict between drawing areas may be resolved, for example, by biasing the new user's border away from the established one rather than centering it on the new participant's cursor.

Figure 16:
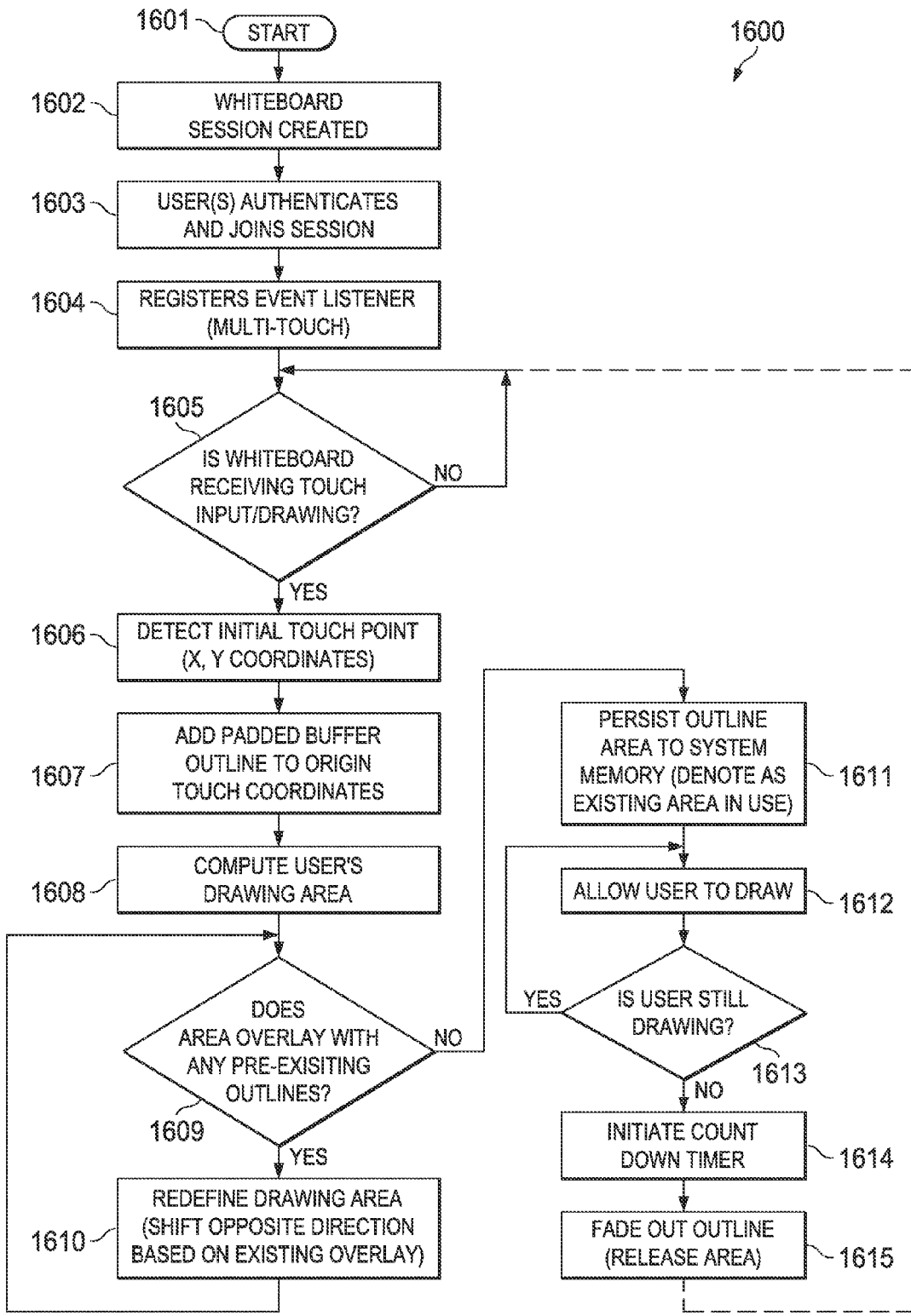
FIG. 16 is a flowchart of a method for dynamic whiteboard drawing space moderation according to some embodiments.

FIG. 16 is a flowchart of a method for dynamic whiteboard drawing space moderation. In some embodiments, method 1600 may be implemented through software as a client-server model via a web, mobile, or desktop application. As illustrated, method 1600 begins at block 1601, and a user or participant creates a whiteboard session at block 1602, for example, via client platform 202 shown in FIG. 2. At block 1603, the user(s) is/are authenticated and join the session. Method 1600 then determines, at block 1605, whether the whiteboard is receiving touch input and/or drawings. If not, control remains at block 1605. Otherwise, at block 1606, method 1600 detects an initial touch point (e.g., x-y coordinates or the like) of a given user.

At block 1607, method 1600 adds a padded buffer outline around the initial touch point, and at block 1608 method 1600 computes the user's drawing area. At block 1609, method 1600 determines whether the area overlaps with any existing outlines (from other reserved areas). If so, block 1610 may redefine the user's drawing area, for example, by shifting the area in the opposite direction as the overlap by a predetermined number of points or pixels. Otherwise, at block 1611, the outlined area is stored in system memory and denoted as an existing or in-use area associated with that user.

At block 1612, method 1600 includes allowing the user to draw. At block 1613, if the user is still drawing, control returns to block 1612. Otherwise, at block 1614, method 1600 initiates a countdown time. Upon expiration of the timer, block 1615 fades out the outline of the user's reserved area, and releases that whiteboarding area to other users. In some cases, the method may be repeated during the same whiteboarding session by passing control from block 1615 back to block 1605.

In some embodiments, a user may disable the time out feature and may reserve their area in the shared virtual workspace for a longer period of time. An example usage model would be to lock an area continuously in a shared whiteboard that is used by a team over the course of multiple meetings; which is the digital equivalent of the "Do Not Erase" note commonly seen on physical meeting room whiteboards.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory including program instructions stored thereon that, upon execution by the processor, cause the IHS to:
   create a virtual collaboration workspace for a plurality of participants, wherein each of the plurality of participants operates a respective device configured to access the virtual collaboration workspace, the virtual collaboration workspace including a public portion and a plurality of private portions, the public portion accessible to each of the plurality of participants and each of the plurality of private portions accessible to a corresponding one of the plurality of participants to the exclusion of at least another one of the plurality of participants;
   provide, to a given one of the plurality of participants, a representation of the public portion and a representation of the given participant's corresponding private portion, wherein the representation of the public portion and the representation of the given participant's corresponding private portion are renderable concurrently in a single window of a graphical user interface displayable by the given participant's respective device;
   provide a list of participants having access to the virtual collaboration workspace to each of the plurality of participants, wherein the list of participants is renderable concurrently with the representation of the public portion and with the representation of the given participant's corresponding private portion in the single window of the graphical user interface displayable by the given participant's respective device;
   receive an indication that the given participant has dragged and dropped a selected participant of the list of participants from the public portion to the given participant's corresponding private portion; and
   create or modify an entry on an access control list corresponding to a piece of content associated with the given participant's corresponding private portion, the entry indicating that the piece of content is accessible to the selected participant.

2. The IHS of claim 1, wherein the IHS includes a projector, and wherein the program instructions, upon execution by the processor, further cause the IHS to host a virtual collaboration session among the plurality of participants using the virtual collaboration workspace.

3. The IHS of claim 2, wherein the projector is configured to create a rendering of the public portion, the rendering viewable in person by at least a subset of the plurality of participants independently of whether the public portion is being displayed by the subset of participants' respective devices.

4. The IHS of claim 2, wherein the virtual collaboration workspace includes a virtual whiteboard, and wherein the program instructions, upon execution by the processor, further cause the IHS to store one or more aspects of the virtual collaboration workspace for reproduction after termination of the virtual collaboration session.

5. The IHS of claim 1, wherein the program instructions, upon execution by the processor, further cause the IHS to maintain an access control list for a piece of content stored in a folder associated with the virtual collaboration workspace.

6. The IHS of claim 5, wherein the program instructions, upon execution by the processor, further cause the IHS to:
receive an indication that the given participant has added a piece of content to the public portion of the virtual collaboration workspace; and
create or modify an entry on the access control list corresponding to the piece of content, the entry indicating that the piece of content is accessible to any of the plurality of participants.

7. The IHS of claim 6, wherein the piece of content is created by the given participant in a whiteboard section of the given participant's corresponding private portion using the given participant's respective device, and wherein prior to adding the piece of content, an entry on the access control list corresponding to the piece of content indicates that the piece of content is accessible to a private group associated with the given participant, the private group excluding one or more of the plurality of participants.

8. The IHS of claim 7, wherein the given participant adds the piece of content by visually dragging a graphical representation of the piece of content from the given participant's corresponding private portion onto the public portion.

9. The IHS of claim 5, wherein the program instructions, upon execution by the processor, further cause the IHS to:
receive an indication that the given participant has added a piece of content to the given participant's corresponding private portion of the virtual collaboration workspace; and
create an entry on the access control list corresponding to the piece of content, the entry indicating that the piece of content is accessible to a private group associated with the given participant, the private group excluding one or more of the plurality of participants.

10. The IHS of claim 1, wherein the program instructions, upon execution by the processor, further cause the IHS to:
receive an indication that the given participant has dragged and dropped a selected participant of the list of participants from the given participant's corresponding private portion to the public portion; and
create or modify an entry on the access control list corresponding to a piece of content associated with the given participant's corresponding private portion, the entry indicating that the piece of content is not accessible to the selected participant.

11. A method, comprising:
establishing, via an Information Handling System (IHS) operated by a given one of a plurality of participants of a virtual collaboration session, communications with a virtual collaboration host device, the virtual collaboration host device configured to host a virtual collaboration workspace having a public portion and a plurality of private portions, wherein the public portion is accessible to the plurality of participants and each of the plurality of private portions is accessible to a corresponding one of the plurality of participants to the exclusion of at least another one of the plurality of participants;
rendering, in a single window of a graphical user interface displayable by the IHS, a representation of the public portion and a representation of the given participant's corresponding private portion;
receiving, at the IHS operated by the given one of the plurality of participants, a list of participants having access to the virtual collaboration workspace;
rendering the list of participants, by the IHS operated by the given one of the plurality of participants, concurrently with the representation of the public portion and the representation of the given participant's corresponding private portion in the single window of the graphical user interface;
identifying, via the IHS operated by the given one of the plurality of participants, a dragging gesture configured to move content to a first selected participant from the list of participants;
transmitting, by the IHS operated by the given one of the plurality of participants, an instruction that the first selected participant be given moderator control over the content during the virtual collaboration session; and
at least one of:
identifying, via the IHS operated by the given one of the plurality of participants, another dragging gesture configured to move a second selected participant from the list of participants to content displayed in the single window of the graphical user interface and transmitting, by the IHS operated by the given one of the plurality of participants, an instruction that the second selected participant be given editor control over the content during the virtual collaboration session; or
identifying, via the IHS operated by the given one of the plurality of participants, another dragging gesture moving a second selected participant from a section of the list of participants in the public portion to another section of the list of participants in the given participant's corresponding private portion and transmitting, by the IHS operated by the given one of the plurality of participants, an instruction that the second selected participant be given editor control over content associated with the given participant's corresponding private portion during the virtual collaboration session.

12. The method of claim 11, further comprising:
identifying, via the IHS operated by the given one of the plurality of participants, a dragging gesture configured to move a file to a file folder in the graphical user interface and uploading the file, by the IHS operated by the given one of the plurality of participants, to a repository associated with the virtual collaboration workspace, wherein the uploaded file inherits an authorization privileges defined by the file folder; or
identifying, via the IHS operated by the given one of the plurality of participants, a dragging gesture configured to move a file to the public portion of the virtual collaboration workspace and uploading the file, by the IHS operated by the given one of the plurality of participants, to a repository associated with the virtual collaboration workspace, wherein the uploaded file is readable by any of the plurality of participants.

13. An Information Handling System (IHS), comprising:
a processor; and
a memory coupled to the processor, the memory including program instructions stored thereon that, upon execution by the processor, cause the IHS to:
create a virtual collaboration workspace for a plurality of participants, wherein each of the plurality of participants operates a respective device configured to access the virtual collaboration workspace, the virtual collaboration workspace including a public portion and a plurality of private portions, the public portion accessible to each of the plurality of participants and each of the plurality of private portions accessible to a corresponding one of the plurality of participants to the exclusion of at least another one of the plurality of participants;

provide, to a given one of the plurality of participants, a representation of the public portion and a representation of the given participant's corresponding private portion, wherein the representation of the public portion and the representation of the given participant's corresponding private portion are renderable concurrently in a single window of a graphical user interface displayable by the given participant's respective device;

provide a list of participants having access to the virtual collaboration workspace to each of the plurality of participants, wherein the list of participants is renderable concurrently with the representation of the public portion and with the representation of the given participant's corresponding private portion in the single window of the graphical user interface displayable by the given participant's respective device;

receive an indication that the given participant has dragged and dropped a selected participant of the list of participants from the given participant's corresponding private portion to the public portion; and create or modify an entry on an access control list corresponding to a piece of content associated with the given participant's corresponding private portion, the entry indicating that the piece of content is not accessible to the selected participant.

* * * * *